United States Patent
Torii et al.

(10) Patent No.: US 11,693,400 B2
(45) Date of Patent: Jul. 4, 2023

(54) UNMANNED AERIAL VEHICLE CONTROL SYSTEM, UNMANNED AERIAL VEHICLE CONTROL METHOD, AND PROGRAM

(71) Applicant: RAKUTEN GROUP, INC., Tokyo (JP)

(72) Inventors: Junji Torii, Tokyo (JP); Jun Takizawa, Chino (JP)

(73) Assignee: RAKUTEN GROUP, INC., Tokyo (JP)

( * ) Notice: Subject to any disclaimer, the term of this patent is extended or adjusted under 35 U.S.C. 154(b) by 252 days.

(21) Appl. No.: 16/642,372

(22) PCT Filed: Feb. 13, 2018

(86) PCT No.: PCT/JP2018/004896
§ 371 (c)(1),
(2) Date: Feb. 27, 2020

(87) PCT Pub. No.: WO2019/159232
PCT Pub. Date: Aug. 22, 2019

(65) Prior Publication Data
US 2020/0310414 A1    Oct. 1, 2020

(51) Int. Cl.
*G05D 1/00* (2006.01)
*B64C 39/02* (2023.01)
(Continued)

(52) U.S. Cl.
CPC ......... *G05D 1/0022* (2013.01); *B64C 39/024* (2013.01); *G05D 1/0016* (2013.01);
(Continued)

(58) Field of Classification Search
None
See application file for complete search history.

(56) References Cited

U.S. PATENT DOCUMENTS

2017/0269594 A1\*  9/2017  Sydnor ............... G05D 1/0077
2018/0068567 A1\*  3/2018  Gong .................... G05D 1/106
(Continued)

FOREIGN PATENT DOCUMENTS

| JP | H0292800 A | | 4/1990 |
|---|---|---|---|
| JP | 10108984 A | \* | 4/1998 |

(Continued)

OTHER PUBLICATIONS

Machine Translation of Yamane (JP 2004359071) (Year: 2022).\*
(Continued)

*Primary Examiner* — Isaac G Smith
*Assistant Examiner* — Jennifer M Anda
(74) *Attorney, Agent, or Firm* — Hea Law PLLC

(57) ABSTRACT

To ensure stability of flying by an unmanned aerial vehicle, first acquisition means of an unmanned aerial vehicle control system acquires first information, which is at least one piece of information for operating an unmanned aerial vehicle that is flying or information on a result of detecting an operation of the unmanned aerial vehicle. Second acquisition means acquires second information for operating the unmanned aerial vehicle after switching of control of the unmanned aerial vehicle. Flight control means restricts, in accordance with the first information and the second information, switching to control of the unmanned aerial vehicle based on the second information.

12 Claims, 11 Drawing Sheets

(51) Int. Cl.
G05D 1/10 (2006.01)
B64U 10/13 (2023.01)

(52) U.S. Cl.
CPC ............. *G05D 1/101* (2013.01); *B64U 10/13* (2023.01); *B64U 2201/10* (2023.01); *B64U 2201/20* (2023.01)

(56) References Cited

U.S. PATENT DOCUMENTS

2019/0180633 A1*  6/2019  Yoshizawa ............. B64D 47/00
2019/0184301 A1*  6/2019  Yanagisawa ............. H04Q 9/00
2020/0218253 A1*  7/2020  Ramamurthy ......... G05B 17/02

FOREIGN PATENT DOCUMENTS

| JP | H10108984 A | | 4/1998 |
| JP | 2004359071 A | * | 12/2004 |
| JP | 2004359071 A | | 12/2004 |
| JP | 2017-74826 A | * | 4/2017 |
| JP | 201774826 A | | 4/2017 |
| JP | 2017214051 A | | 12/2017 |

OTHER PUBLICATIONS

Machine Translation of Kanto (JP 10-108984) (Year: 2022).*
Machine Translation of Kiyokazu (JP 2017-74826) (Year: 2022).*
English translation of the International Search Report for PCT/JP2018/004896.

* cited by examiner

FIG.3

| OPERATION COMPONENT | OPERATION STATE |
|---|---|
| STICK ST1 | NEUTRAL |
| STICK ST2 | NEUTRAL |
| BUTTON B1 | ON |
| BUTTON B2 | OFF |
| BUTTON B3 | OFF |
| BUTTON B4 | ON |
| BUTTON B5 | OFF |
| BUTTON B6 | OFF |
| SWITCH SW1 | OFF |
| SWITCH SW2 | OFF |
| ⋮ | ⋮ |

FIG.6

| COMMUNICATOR | OPERATION AUTHORITY FLAG |
|---|---|
| WIRELESS COMMUNICATOR 130A | 1 |
| WIRELESS COMMUNICATOR 130B | 0 |
| WIRELESS COMMUNICATOR 130C | 0 |

US 11,693,400 B2

UNMANNED AERIAL VEHICLE CONTROL SYSTEM, UNMANNED AERIAL VEHICLE CONTROL METHOD, AND PROGRAM

CROSS REFERENCE TO RELATED APPLICATIONS

This application is a National Stage of International Application No. PCT/JP2018/004896 filed on Feb. 13, 2018. The contents of the above document is incorporated herein by reference in its entirety.

TECHNICAL FIELD

The present invention relates to an unmanned aerial vehicle control system, an unmanned aerial vehicle control method, and a program.

BACKGROUND ART

Hitherto, there has been known a technology of operating an unmanned aerial vehicle by using a wireless operation device. For example, in Patent Literature 1, there is described a system of switching, when an unmanned aerial vehicle is flying, from a first state, in which first instruction information from a first wireless operation device is effective, to a second state, in which second instruction information from a second wireless operation device is effective.

CITATION LIST

Patent Literature

[PTL 1] JP H02-092800 A

SUMMARY OF INVENTION

Technical Problem

However, in the technology of Patent Literature 1, in a case where details of the first instruction information and details of the second instruction information are greatly different from each other, a drastic change in state of the unmanned aerial vehicle occurs when the first state is switched to the second state, resulting in a difficulty in flying stably. Such an issue may occur not only when the first wireless operation device is switched to the second wireless operation device as in Patent Literature 1, but also when the unmanned aerial vehicle switches from an autonomous flight state to an operator operating state, when the unmanned aerial vehicle switches from the operator operating state to the autonomous flight state, and when an autonomous flight method used by the unmanned aerial vehicle switches. Also in those cases, when a drastic change in state of the unmanned aerial vehicle occurs at the time of switching, it becomes difficult for the unmanned aerial vehicle to fly stably.

The one or more embodiments of the present invention has been made in view of the above-mentioned issue, and has an object to ensure stability of flying by an unmanned aerial vehicle.

Solution to Problem

In response to the above-mentioned issue, according to one embodiment of the present invention, there is provided an unmanned aerial vehicle control system including: first acquisition means for acquiring first information, which is at least one piece of information for operating an unmanned aerial vehicle that is flying or information on a result of detecting an operation of the unmanned aerial vehicle; second acquisition means for acquiring second information for operating the unmanned aerial vehicle after switching of control of the unmanned aerial vehicle; and flight control means for restricting, in accordance with the first information and the second information, switching to control of the unmanned aerial vehicle based on the second information.

According to one embodiment of the present invention, there is provided an unmanned aerial vehicle control method including: a first acquisition step of acquiring first information, which is at least one piece of information for operating an unmanned aerial vehicle that is flying or information on a result of detecting an operation of the unmanned aerial vehicle; a second acquisition step of acquiring second information for operating the unmanned aerial vehicle after switching of control of the unmanned aerial vehicle; and a flight control step of restricting, in accordance with the first information and the second information, switching to control of the unmanned aerial vehicle based on the second information.

According to one embodiment of the present invention, there is provided a program for causing a computer to function as: first acquisition means for acquiring first information, which is at least one piece of information for operating an unmanned aerial vehicle that is flying or information on a result of detecting an operation of the unmanned aerial vehicle; second acquisition means for acquiring second information for operating the unmanned aerial vehicle after switching of control of the unmanned aerial vehicle; and flight control means for restricting, in accordance with the first information and the second information, switching to control of the unmanned aerial vehicle based on the second information.

Further, in one aspect of the present invention, the unmanned aerial vehicle is configured to operate based on first instruction information from first wireless operation means, the second acquisition means is configured to acquire second instruction information from second wireless operation means as the second information, and the flight control means is configured to restrict switching from control of the unmanned aerial vehicle based on the first instruction information to control of the unmanned aerial vehicle based on the second instruction information.

Further, in one aspect of the present invention, the first acquisition means is configured to acquire the first instruction information as the first information, and the flight control means is configured to restrict switching based on the first instruction information and the second instruction information.

Further, in one aspect of the present invention, the flight control means is configured to restrict switching based on whether the first instruction information and the second instruction information match each other.

Further, in one aspect of the present invention, the unmanned aerial vehicle is configured to fly autonomously, the second acquisition means is configured to acquire instruction information from wireless operation means as the second information, and the flight control means is configured to restrict switching from autonomous flight control to control of the unmanned aerial vehicle based on the instruction information.

Further, in one aspect of the present invention, the first information includes information on at least one of a movement direction or movement speed of the unmanned aerial vehicle that is autonomously flying, and the instruction information includes information on at least one of a direction or speed specified for the unmanned aerial vehicle.

Further, in one aspect of the present invention, the first information includes information on at least one of a flight path in a case where the unmanned aerial vehicle is caused to fly autonomously or a state of the unmanned aerial vehicle.

Further, in one aspect of the present invention, the unmanned aerial vehicle is configured to operate based on first instruction information from first wireless operation means before autonomous flight, the unmanned aerial vehicle is configured to switch from control of the unmanned aerial vehicle based on the first instruction information to the autonomous flight control, the second acquisition means is configured to acquire second instruction information from second wireless operation means as the second information, and the flight control means is configured to restrict switching from the autonomous flight control to control of the unmanned aerial vehicle based on the second instruction information.

Further, in one aspect of the present invention, the unmanned aerial vehicle is configured to operate based on instruction information from wireless operation means, the second information includes information for causing the unmanned aerial vehicle to fly autonomously, and the flight control means is configured to restrict switching from control of the unmanned aerial vehicle based on the instruction information to autonomous flight control.

Further, in one aspect of the present invention, the first information includes information on at least one of a movement direction or movement speed of the unmanned aerial vehicle that is flying based on the instruction information, and the second information includes information on at least one of a movement direction or movement speed in a case where the unmanned aerial vehicle is caused to fly autonomously.

Further, in one aspect of the present invention, the second information includes information on at least one of a flight path in a case where the unmanned aerial vehicle is caused to fly autonomously or a state of the unmanned aerial vehicle.

Further, in one aspect of the present invention, the unmanned aerial vehicle is configured to fly autonomously based on first autonomous flight control, the second information includes information for causing the unmanned aerial vehicle to fly autonomously based on second autonomous flight control, and the flight control means is configured to restrict switching from the first autonomous flight control to the second autonomous flight control.

Further, in one aspect of the present invention, the first information includes information on at least one of a movement direction or movement speed of the unmanned aerial vehicle that is autonomously flying under the first autonomous flight control, and the second information includes information on at least one of a movement direction or movement speed in a case where the unmanned aerial vehicle is caused to fly autonomously under the second autonomous flight control.

Further, in one aspect of the present invention, the first information includes information on at least one of a flight path of the unmanned aerial vehicle that is autonomously flying under the first autonomous flight control or a state of the unmanned aerial vehicle, and the second information includes information on at least one of a flight path in a case where the unmanned aerial vehicle is caused to fly autonomously under the second autonomous flight control or the state of the unmanned aerial vehicle.

Further, in one aspect of the present invention, the flight control means is configured to switch control when the control is enabled to be switched to control of the unmanned aerial vehicle based on the second information and a predetermined switching request is acquired from wireless operation means, and the unmanned aerial vehicle control system further includes notification means for issuing a predetermined notification in the wireless operation means when the control is enabled to be switched to the control of the unmanned aerial vehicle based on the second information.

Further, in one aspect of the present invention, the unmanned aerial vehicle control system further includes notification means for issuing a predetermined notification in wireless operation means when control is switched to control of the unmanned aerial vehicle based on the second information.

Further, in one aspect of the present invention, the unmanned aerial vehicle control system further includes notification means for notifying, when switching is restricted by the flight control means, information for canceling the restriction in wireless operation means.

Further, in one aspect of the present invention, the flight control means is configured to restrict switching when a predetermined switching request for switching to control of the unmanned aerial vehicle based on the second information is acquired.

Further, in one aspect of the present invention, the unmanned aerial vehicle control system further includes call means for causing the first wireless operation means and the second wireless operation means to make a phone call to each other when control of the unmanned aerial vehicle based on the first instruction information is to be switched to control of the unmanned aerial vehicle based on the second instruction information.

Further, in one aspect of the present invention, the flight control means is configured to gradually switch to control of the unmanned aerial vehicle based on the second information.

Further, in one aspect of the present invention, the unmanned aerial vehicle includes the first acquisition means, the second acquisition means, and the flight control means.

Advantageous Effects of Invention

According to one or more embodiments of the present invention, stability of flying by an unmanned aerial vehicle can be ensured.

BRIEF DESCRIPTION OF DRAWINGS

FIG. 3 is a table for showing an example of data storage of instruction information.

FIG. 6 is a table for showing an example of data storage of operation authority data.

DESCRIPTION OF EMBODIMENTS

1. First Embodiment

A description is now given of an unmanned aerial vehicle control system according to an exemplary embodiment of the present invention.

[1-1. Entire Configuration of Unmanned Aerial Vehicle Control System]

Figure 1:
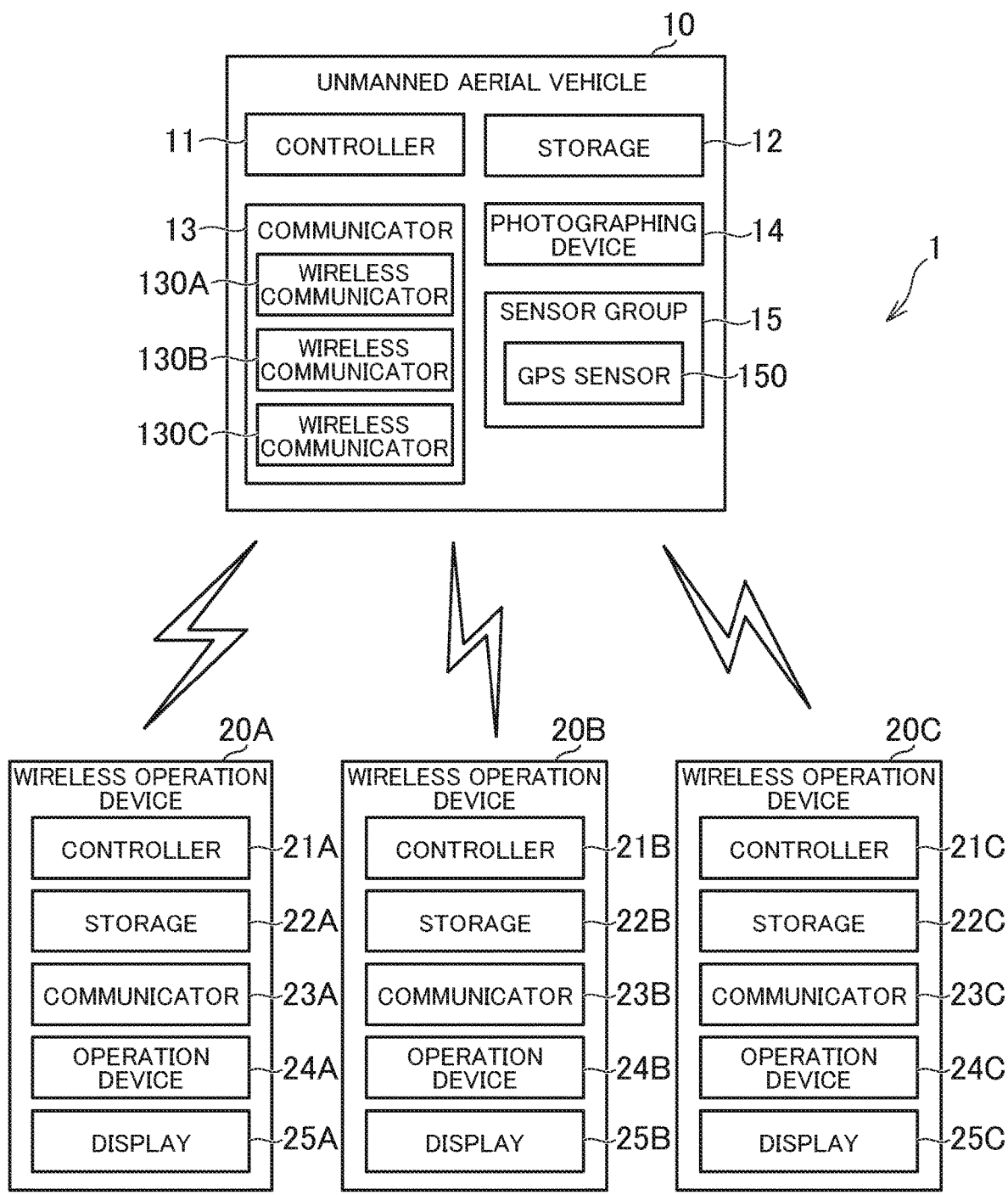
FIG. 1 is a diagram for illustrating an entire configuration of an unmanned aerial vehicle control system.

FIG. 1 is a diagram for illustrating an entire configuration of an unmanned aerial vehicle control system. As illustrated in FIG. 1, an unmanned aerial vehicle control system 1 includes an unmanned aerial vehicle 10 and wireless operation devices 20A to 20C. In the following, the wireless operation devices 20A to 20C are referred to simply as "wireless operation device 20" when the wireless operation devices 20A to 20C are not particularly required to be distinguished from one another.

In a first embodiment of the present invention, a description is given of a case in which one unmanned aerial vehicle 10 is included in the unmanned aerial vehicle control system 1. However, the unmanned aerial vehicle control system 1 may include a plurality of unmanned aerial vehicles 10. Further, in the first embodiment, a description is given of a case in which the unmanned aerial vehicle control system 1 includes three wireless operation devices 20. However, the number of wireless operation devices 20 included in the unmanned aerial vehicle control system 1 may be one, or may be two or four or more.

The unmanned aerial vehicle 10 is an aerial vehicle without a person, and is, for example, an unmanned aerial vehicle (so-called "drone") driven by a battery or an unmanned aerial vehicle driven by an engine. For example, the unmanned aerial vehicle may store a package such as a product or a piece of mail, and flies to a delivery destination to deliver the package, or flies to a collection destination to collect the package. The unmanned aerial vehicle 10 may fly for various purposes, and in addition to the purpose of delivering a package, the unmanned aerial vehicle 10 may fly to acquire a situation of a flight destination, for example, or may fly for a purpose of distributing pesticides in a farm, for example.

The unmanned aerial vehicle 10 includes a controller 11, a storage 12, a communicator 13, a photographing device 14, and a sensor group 15. Although the unmanned aerial vehicle 10 includes a propeller, a motor (example of actuator), a battery, and an antenna, for example, a description thereof is omitted here.

The controller 11 includes, for example, at least one microprocessor. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a hard disk drive or a flash memory.

The communicator 13 includes a communication interface for wired communication or wireless communication. The communicator 13 is configured to perform communication under a predetermined communication protocol. The communicator 13 may include both of a transmitter and a receiver, or may include only a receiver without including a transmitter.

The communication interface included in the communicator 13 may have one system (one channel), but in the first embodiment, a description is given of a case in which the communicator 13 includes communication interfaces of a plurality of systems (a plurality of channels). For example, the communicator 13 includes wireless communicators 130A to 130C, and includes communication interfaces of three systems. The communicator 13 may include communication interfaces of two systems, or may include four or more systems.

The wireless communicators 130A to 130C use different frequency bands (e.g., frequency in 2.4 GHz band or 5.0 GHz band) so as to avoid interferences among the wireless communicators 130A to 130C. For example, the wireless communicator 130A uses a first frequency band (first channel), the wireless communicator 130B uses a second frequency band (second channel), and the wireless communicator 130C uses a third frequency channel (third channel).

It is assumed that the first frequency band, the second frequency band, and the third frequency band uses at least different central frequencies, but there may be an overlapping portion, and parts of those frequency bands may overlap with each other. In the following, when the wireless communicators 130A to 130C are not particularly required to be distinguished from one another, those wireless communicators 130A to 130C are simply referred to as "wireless communicator 130".

Further, in the first embodiment, a description is given of a wireless communication method for a specific device (e.g., so-called "radio controller"), such as FASST, FHSS, DMSS, or AFHSS. However, various known methods can be applied as the wireless communication method itself, and for example, methods for a general device, such as wireless LAN, Bluetooth (trademark), iBeacon (trademark), or Wi-Fi Direct (trademark), may be applied. Further, any one of short-range wireless communication, middle-range wireless communication, and long-range wireless communication may be employed for wireless communication.

The photographing device 14 is at least one camera. For example, the photographing device 14 includes an image pickup element such as a CCD image sensor or a CMOS image sensor, and records an image picked up by the image pickup element as digital data. The image may be a still image or a moving image picked up continuously at a predetermined frame rate. The photographing device 14 may not be included in the unmanned aerial vehicle 10.

The sensor group 15 includes a GPS sensor 150, for example. The GPS sensor 150 includes a receiver configured to receive signals from satellites, and for example, detects positional information based on the signals received by the receiver. The positional information is latitude/longitude information, for example, and is coordinate information on the earth. The unmanned aerial vehicle 10 may mount any sensor, and the sensor group 15 may include any sensor such as an infrared sensor, an ultrasonic sensor, a sound sensor (microphone), an acceleration sensor, a gyro sensor, a wind sensor, a geomagnetic sensor, an altitude sensor, a displacement sensor, a pressure-sensitive sensor, a temperature sensor, or a motor encoder (rotational position sensor).

The wireless operation device 20 is a device for operating the unmanned aerial vehicle 10, and is, for example, a proportional controller or a controller. The wireless operation device 20 is only required to be capable of performing direct or indirect communication to/from the unmanned aerial vehicle 10, and may be, for example, a smartphone (cell phone), a tablet terminal, or a personal computer. The term "direct communication" refers to communication without intervention of another computer, for example, a server computer, and the term "indirect communication" refers to communication via another computer (or the Internet and other networks).

In the first embodiment, a description is given of a case in which the wireless operation devices 20A to 20C have the same configuration, but the configurations of those components may be different from one another. In the following, when the controllers 21A to 21C are not particularly required to be distinguished from one another, the controllers 21A to 21C are simply referred to as "controller 21". Similarly, storages 22A to 22C, communicators 23A to 23C, operation devices 24A to 24C, and displays 25A to 25C may be simply referred to as "storage 22", "communicator 23", "operation device 24", and "display 25", respectively.

As illustrated in FIG. 1, the wireless operation device 20 includes the controller 21, the storage 22, the communicator 23, the operation device 24, and the display 25. The hardware configurations of the controller 21, the storage 22, and the communicator 23 are similar to those of the controller 11, the storage 12, and the communicator 13, respectively, and thus a description thereof is omitted here. The wireless operation device 20 includes an antenna and a battery, for example, but a description thereof is omitted here.

For example, the communicator 23 may include both of a transmitter and a receiver so as to enable the unmanned aerial vehicle 10 and the wireless operation device 20 to communicate to/from each other. In other cases, the communicator 23 may include only the transmitter without particularly including a receiver so as to enable the wireless operation device 20 to communicate to the unmanned aerial vehicle 10 in only one direction. It is assumed that a frequency band to be used by the communicator 23 is adjusted in advance. That is, it is assumed that which channel is to be used by the communicator 23 is adjusted in advance.

Further, for example, the communicator 23A of the wireless operation device 20A uses the first frequency band to communicate to/from the wireless communicator 130A of the unmanned aerial vehicle 10. Further, for example, the communicator 23 of the wireless operation device 20B uses the second frequency band to communicate to/from the wireless communicator 130B of the unmanned aerial vehicle 10. Further, for example, the communicator 23 of the wireless operation device 20B uses the third frequency band to communicate to/from the wireless communicator 130C of the unmanned aerial vehicle 10.

The operation device 24 includes at least one operation component for operating the unmanned aerial vehicle 10. The operation component is only required to be a component capable of receiving input from an operator, and is, for example, a button, a stick, a switch, a lever, a touch panel, a keyboard, or a mouse. The operation device 24 described below is only an example, and any combination of operation components can be employed for the wireless operation device 20.

Figure 2:
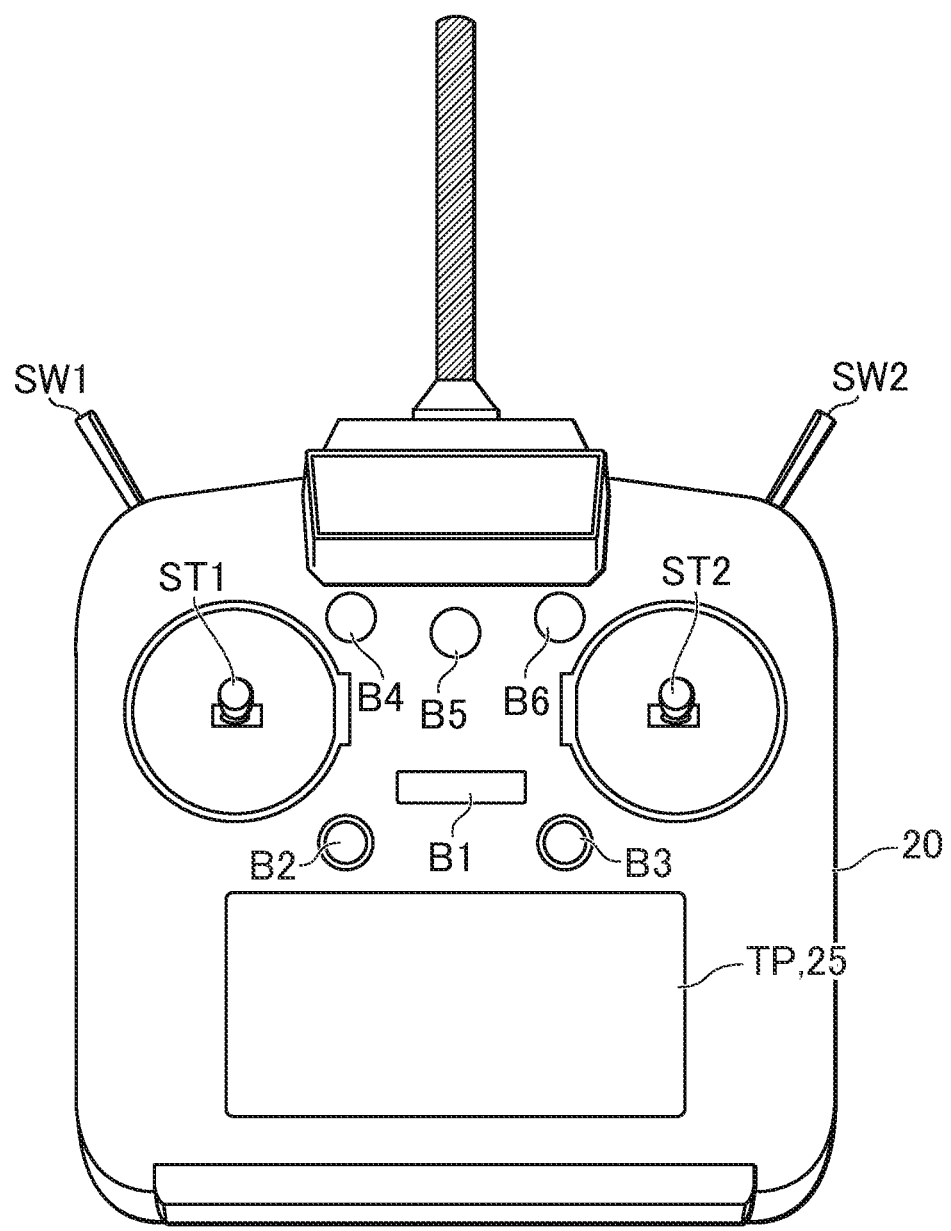
FIG. 2 is an external view of a wireless operation device for illustrating an operation device.

FIG. 2 is an external view of the wireless operation device 20 for illustrating the operation device 24. As illustrated in FIG. 2, the operation device 24 in the first embodiment includes a plurality of operation components such as sticks ST1 and ST2, buttons B1 to B6, switches SW1 and SW2, and a touch panel TP. In the following, when the sticks ST1 and ST2 are not particularly required to be distinguished from each other, the sticks ST1 and ST2 are simply referred to as "stick ST". Similarly, the buttons B1 to B6 may be simply referred to as "button B", and the switches SW1 and SW2 may be simply referred to as "switch SW".

The stick ST can be tilted in at least one of an up-down direction (perpendicular direction or vertical direction) or a left-right direction (horizontal direction or lateral direction), and is used for, for example, specifying a movement direction or a turning direction of the unmanned aerial vehicle 10. The stick ST may be tilted in an oblique direction. For example, it is assumed that a correspondence relationship between the direction of tilting the stick ST and a motion of the unmanned aerial vehicle 10 (movement direction or turning direction) is stored in the storage 22 in advance. This correspondence relationship may be prohibited from being edited, or may be allowed to be edited. The unmanned aerial vehicle 10 moves in association with the direction of tilting the stick ST by the operator.

For example, when the operator tilts the stick ST1 in an up direction, the unmanned aerial vehicle 10 moves forward (in a positive direction of a roll axis), whereas when the operator tilts the stick ST1 in a down direction, the unmanned aerial vehicle 10 moves backward (in a negative direction of the roll axis). Further, for example, when the operator tilts the stick ST1 in a left direction, the unmanned aerial vehicle 10 turns leftward (counterclockwise), whereas when the operator tilts the stick ST1 in a right direction, the unmanned aerial vehicle 10 turns rightward (clockwise).

Further, for example, when the operator tilts the stick ST2 in an up direction, the unmanned aerial vehicle 10 moves up (moves in a negative direction of a yaw axis), whereas when the operator tilts the stick ST2 in a down direction, the unmanned aerial vehicle 10 moves down (moves in a positive direction of the yaw axis). Further, for example, when the operator tilts the stick ST2 in a left direction, the unmanned aerial vehicle 10 moves in the left direction (in a negative direction of a pitch axis), whereas when the operator tilts the stick ST2 in a right direction, the unmanned aerial vehicle 10 moves in the right direction (in a positive direction of the pitch axis). When the stick ST1 and the stick ST2 are not tilted, that is, are in a neutral position, the unmanned aerial vehicle 10 hovers.

The buttons B are associated with functions of the unmanned aerial vehicle 10 in advance. It is assumed that the correspondence relationship between the buttons B and the functions is stored in the storage 22 in advance. This correspondence relationship may be prohibited from being edited, or may be allowed to be edited. The wireless operation device 20 executes processing relating to a function corresponding to a button pressed by the operator.

For example, the button B1 is associated with a function of turning on/off power, and when the operator presses the button B1, the wireless operation device 20 turns on/off the power. For example, when the power is turned on, the wireless operation device 20 transmits instruction information to nearby components via the communicator 23.

FIG. 3 is a table for showing an example of data storage of the instruction information. As shown in FIG. 3, the instruction information is information indicating an instruction given by the operator. In other words, the instruction information is information indicating an operation state of each operation component included in the operation device 24, and is a wireless control signal for the unmanned aerial vehicle 10. For example, the instruction information includes information such as a direction and angle of tilting of the stick ST, an on/off state of the button B, and an on/off state of the switch SW. Further, for example, the instruction information may include details of an instruction input by the operator via the touch panel TP.

For example, when the unmanned aerial vehicle 10 enters a communication range of the wireless operation device 20, instruction information is transmitted from the wireless operation device 20 to the unmanned aerial vehicle 10. The unmanned aerial vehicle 10 may receive the instruction information after establishing communication to/from the wireless operation device 20 under a predetermined protocol, or may receive the instruction information without particularly executing processing of establishing the communication.

The wireless operation device 20 may transmit the instruction information regularly, or may transmit the instruction information only when the operator performs some operation (that is, unregularly). Further, the instruction information is not required to include operation states of all the operation components, and may include operation states of only a part of the operation components (e.g., only the information for identifying the pressed button B).

Further, the instruction information is only required to have a data format determined in advance, and is not limited to the example of FIG. 3. For example, when the posture of the wireless operation device 20 is used for operating the unmanned aerial vehicle 10, the posture of the wireless operation device 20 may be included in the instruction information. In other cases, for example, when a sound of the operator is used for operating the unmanned aerial vehicle 10, a result of detecting the sound may be included in the instruction information.

Further, for example, the button B2 is associated with a function of requesting for an operation authority for the unmanned aerial vehicle 10, and when the operator presses the button B2, it is possible to request the unmanned aerial vehicle 10 for the operation authority.

The operation authority is an authority to operate the unmanned aerial vehicle 10, and is an authority to control the unmanned aerial vehicle 10. In the first embodiment, a description is given of a case in which there is only one wireless operation device 20 to which the operation authority is given, but the operation authority may be given to the plurality of wireless operation devices 20 at the same time. A wireless operation device 20 to which the operation authority is given can control the unmanned aerial vehicle 10. For example, when the operation authority is given, the instruction information becomes effective, whereas when the operation authority is not given, the instruction information becomes ineffective. In other words, a wireless operation device 20 to which the operation authority is given can influence flight control of the unmanned aerial vehicle 10, and a wireless operation device 20 to which the operation authority is not given does not influence flight control of the unmanned aerial vehicle 10.

Further, for example, the button B3 is associated with a function of causing the unmanned aerial vehicle 10 to return to a predetermined location, and when the operator presses the button B3, it is possible to cause the unmanned aerial vehicle 10 to return to the predetermined location. The predetermined location is only required to be a location determined in advance, and may be, for example, a departure location of the unmanned aerial vehicle 10 or a current location of the wireless operation device 20.

Further, for example, the buttons B4 to B6 are associated with functions of specifying a flight mode of the unmanned aerial vehicle 10, and the unmanned aerial vehicle 10 flies in a flight mode corresponding to any one of the buttons B4 to B6. The flight mode is a method of controlling flying by the unmanned aerial vehicle 10. In the first embodiment, three flight modes are prepared, and for example, there are an autonomous flight mode, a GPS manual flight mode, and a complete manual flight mode. In the following, the GPS manual flight mode and the complete manual flight mode may be collectively referred to as "manual flight mode".

The autonomous flight mode is a flight mode for causing the unmanned aerial vehicle 10 to fly autonomously. The term "autonomous flight" refers to executing flight control by the unmanned aerial vehicle 10 itself without being given an instruction by the operator. For example, the autonomous flight mode may be a flight mode in which the unmanned aerial vehicle 10 flies autonomously on a path determined in advance, or may be a flight mode in which the unmanned aerial vehicle 10 flies so as to keep a predetermined positional relationship with a specific subject (so as to monitor a subject, for example) based on an image photographed by the photographing device 14. For example, in the autonomous flight mode, even when the operator tilts the stick ST, the unmanned aerial vehicle 10 does not move in association with that direction. That is, in the autonomous flight mode, an instruction given by the stick ST does not influence the flight control.

The GPS manual flight mode is a flight mode in which positional information detected by the GPS sensor 150 is auxiliarly used. For example, in the GPS manual flight mode, when the operator tilts the stick ST, the unmanned aerial vehicle 10 uses the positional information detected by the GPS sensor 150 to move between three-dimensional or two-dimensional coordinates divided in a grid pattern. That is, in the GPS manual flight mode, the operator can specify a direction of movement between coordinates.

The complete manual flight mode is a flight mode in which the operator tilts the stick ST to cause the unmanned aerial vehicle 10 to move in a manner specified by the stick ST. For example, in the complete manual flight mode, the unmanned aerial vehicle 10 moves or turns in a direction of tilting the stick ST by the operator. In the complete manual flight mode, all the motions including posture control may be manual, or only the instruction for the movement direction may be manual and the processing of, for example, posture control may be automatic.

For example, the button B4 is associated with the autonomous flight mode, and when the operator presses the button B4, the unmanned aerial vehicle 10 flies in the autonomous flight mode. Further, for example, the button B5 is associated with the GPS manual flight mode, and when the operator presses the button B5, the unmanned aerial vehicle 10 flies in the GPS manual flight mode. Further, for example, the button B6 is associated with the complete manual flight mode, and when the operator presses the button B6, the unmanned aerial vehicle 10 flies in the complete manual flight mode.

The number of flight modes is not limited to three, and there may be only one, or may be two or four or more flight modes. Further, the flight mode may be switched freely, or the flight mode may be switched in only one direction in such a manner that the autonomous flight mode can be switched to the GPS manual flight mode, but the GPS manual flight mode cannot be switched to the autonomous flight mode.

For example, the switch SW1 is associated with a function of opening/closing a mechanism for holding a package, and when the operator switches the switch SW1, it is possible to cause the unmanned aerial vehicle 10 to open/close the mechanism for holding a package. Further, for example, the switch SW2 is associated with a function of opening/closing a safety mechanism, for example, a parachute, and when the operator switches the switch SW2, it is possible to cause the unmanned aerial vehicle 10 to open/close the safety mechanism. Further, for example, the touch panel TP is a touch panel for giving various kinds of instructions by the operator, and the operator can touch the touch panel TP to change settings of the wireless operation device 20, for example.

The display 25, which is a liquid crystal display or an organic EL display, for example, is placed under the touch panel TP. The display 25 displays a screen in accordance with an instruction given by the controller 21.

The hardware configurations of the unmanned aerial vehicle 10 and the wireless operation device 20 are not limited to the example of FIG. 1, and various kinds of hardware can be employed. For example, the unmanned aerial vehicle 10 may include an operation device such as a touch panel or a button, or may include a display such as a liquid crystal display or an organic EL display.

Further, for example, the wireless operation device 20 includes a group of sensors such as a GPS sensor, an acceleration sensor, a gyro sensor, a pressure-sensitive sensor, or a temperature sensor. In this case, the position or posture of the wireless operation device 20 may be used for giving an instruction to the unmanned aerial vehicle 10. Further, for example, the wireless operation device 20 may include a sound output device such as a speaker or an earphone jack, a sound input device, for example, a microphone, a light emitter, for example, an LED light, or a vibrator.

Further, for example, each of the unmanned aerial vehicle 10 and the wireless operation device 20 may include a reading device (e.g., memory card slot or optical disc drive) configured to read a computer-readable information storage medium, or may include an input/output device (e.g., USB port) for communicating to/from an external device. Further, for example, a program and data described as being stored into the storages 12 and 22 may be supplied via the reading device or input/output device, or may be supplied via a network.

1-2. Outline of First Embodiment

Figure 4:
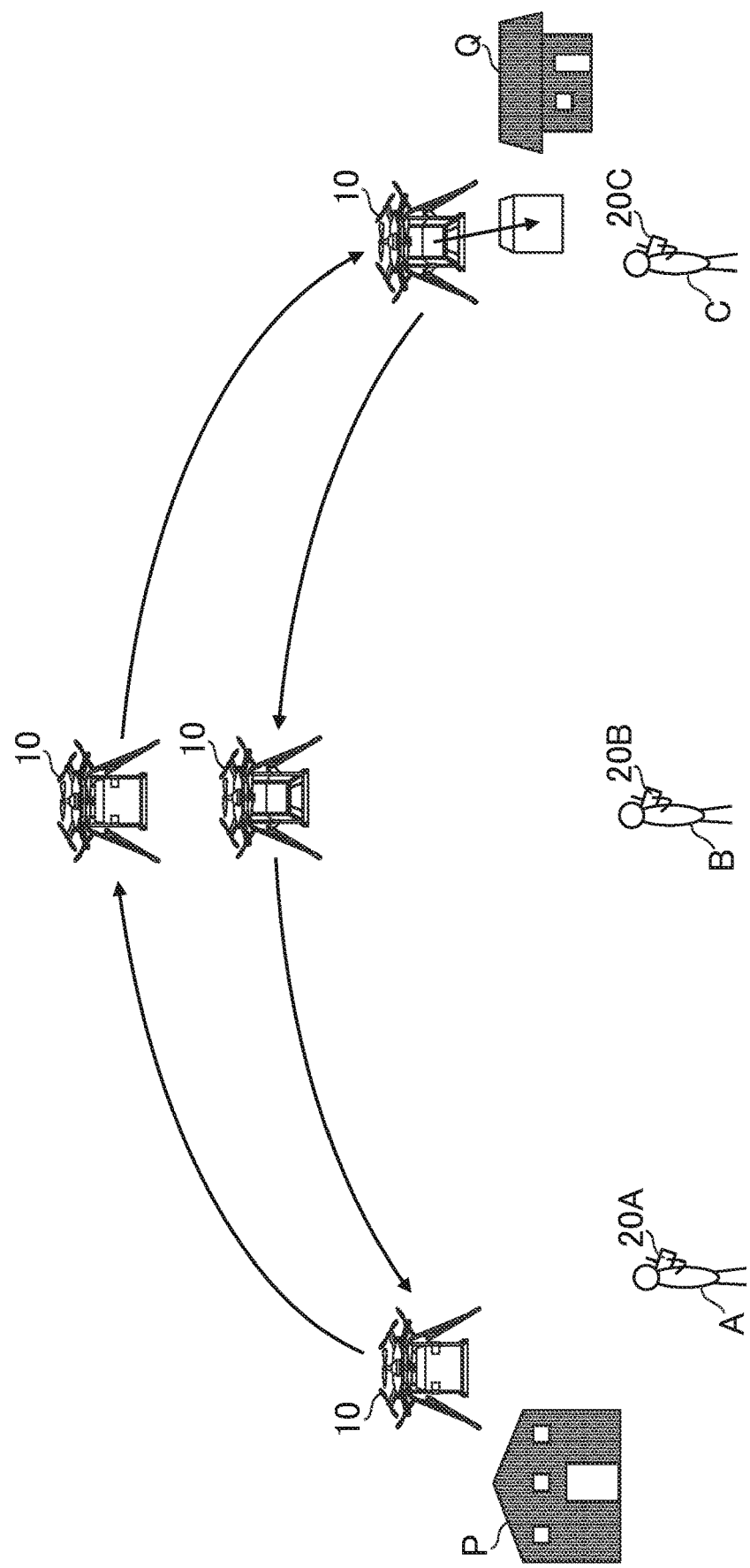
FIG. 4 is a diagram for illustrating a situation in which an unmanned aerial vehicle is flying.

FIG. 4 is a diagram for illustrating a situation in which the unmanned aerial vehicle 10 is flying. As illustrated in FIG. 4, for example, the unmanned aerial vehicle 10 carries a package from a departure location P to a target location Q, unloads the package, and returns to the departure location P. In the first embodiment, the unmanned aerial vehicle 10 flies in the autonomous flight mode in principle, but it is assumed that the unmanned aerial vehicle 10 flies under a state of being able to communicate to/from at least one wireless operation device 20 in a range capable of being recognized visually by at least one operator so that the operator can operate the unmanned aerial vehicle 10 by switching to the GPS manual flight mode or the complete manual flight mode.

In the example of FIG. 4, three operators A to C are arranged between the departure location P and the target location Q. For example, the operator A is in charge of flying the unmanned aerial vehicle 10 near the departure location P by operating the wireless operation device 20A. Further, for example, the operator B is in charge of flying the unmanned aerial vehicle 10 near an intermediate point by operating the wireless operation device 20B. Further, for example, the operator C is in charge of flying the unmanned aerial vehicle 10 near the target location Q by operating the wireless operation device 20C. The number of operators is not limited to three, and may be one, or may be two or four or more. The number of prepared wireless operation devices 20 may be determined depending on the number of operators.

For example, when the unmanned aerial vehicle 10, which has loaded a package at the departure location P, becomes able to communicate to/from the wireless operation device 20A via the wireless communicator 130A, the unmanned aerial vehicle 10 takes off to start to fly to the target location Q. Immediately after the departure, the unmanned aerial vehicle 10 is under control of the wireless operation device 20A and can be operated by the operator A. The operator A may visually recognize the unmanned aerial vehicle 10 at the original place without particularly moving from the place, or may move so as to follow the unmanned aerial vehicle 10. This point holds true also for the other operators B and C.

When the unmanned aerial vehicle 10 has flown toward the target location Q for a certain distance, the unmanned aerial vehicle 10 enters a communication range of the wireless operation device 20B, and becomes able to communicate to/from the wireless operation device 20B via the wireless communicator 130B. In this case, the unmanned aerial vehicle 10 is able to communicate to/from the wireless operation device 20A and the wireless operation device 20B at the same time, and receives instruction information from the wireless operation device 20A and instruction information from the wireless operation device 20B. However, at this point in time, the unmanned aerial vehicle 10 is under control of the wireless operation device 20A, and thus the unmanned aerial vehicle 10 flies based on the instruction information from the wireless operation device 20A and ignores the instruction information from the wireless operation device 20B.

For example, when the wireless operation device 20A holds the operation authority and the operator B presses the button B2 of the wireless operation device 20B, the operation authority can be transferred to the wireless operation device 20B. That is, when the operator B has pressed the button B2 of the wireless operation device 20B, it is possible to switch from a state in which the unmanned aerial vehicle 10 is under control of the wireless operation device 20A to a state in which the unmanned aerial vehicle 10 is under control of the wireless operation device 20B.

However, when the instruction information (instruction by operator A) from the wireless operation device 20A and the instruction information (instruction by operator B) from the wireless operation device 20B are greatly different from each other, and the operation authority is transferred from the wireless operation device 20A to the wireless operation device 20B, a drastic change in state of the unmanned aerial vehicle 10 may occur, resulting in a failure to ensure stability of flying.

For example, when the button B5 or B6 of the wireless operation device 20B is pressed in spite of the button B4 of the wireless operation device 20A being pressed and the unmanned aerial vehicle 10 flying in the autonomous flight mode, the flight mode may abruptly change during transfer of the operation authority, resulting in a failure to ensure stability of flying. In other cases, for example, in a case where the unmanned aerial vehicle 10 is flying in the GPS manual flight mode or in the complete manual flight mode, when the stick ST1 of the wireless operation device 20A is tilted toward the right direction in spite of the stick ST1 of the wireless operation device 20A being tilted toward the left direction, the turning direction of the unmanned aerial vehicle 10 may abruptly change, resulting in a failure to ensure stability of flying.

Thus, in the first embodiment, even in a case where the unmanned aerial vehicle 10 becomes able to communicate to/from two operation devices, namely, the wireless operation device 20A and the wireless operation device 20B at the same time, and the operation authority can be transferred in terms of communication, when the instruction information from the wireless operation device 20A and the instruction information from the wireless operation device 20B do not match each other, the operation authority is not transferred.

For example, when the operator B presses the button B2 of the wireless operation device 20B, the unmanned aerial vehicle 10 determines whether or not the instruction information from the wireless operation device 20A and the instruction information from the wireless operation device 20B match each other. When the unmanned aerial vehicle 10 determines that those pieces of information do not match each other, the unmanned aerial vehicle 10 prohibits transfer of the operation authority, whereas when the unmanned aerial vehicle 10 determines that those pieces of information do not match each other, the unmanned aerial vehicle 10 allows transfer of the operation authority. When the operation authority is transferred, the operator B becomes able to operate the unmanned aerial vehicle 10, and the unmanned aerial vehicle 10 is under control of the wireless operation device 20B.

When the unmanned aerial vehicle 10 has further flown toward the target location Q, the unmanned aerial vehicle 10 intrudes into a communication range of the wireless operation device 20C, and becomes able to communicate to/from the wireless operation device 20C via the wireless communicator 130C. Also in this case, it is possible to transfer the operation authority to the wireless operation device 20C when the instruction information from the wireless operation device 20B and the instruction information from the wireless operation device 20C match each other. When the operation authority has transferred, the operator C becomes able to operate the unmanned aerial vehicle 10, and the unmanned aerial vehicle 10 is under control of the wireless operation device 20C.

After that, when the unmanned aerial vehicle 10 has arrived at the target location Q, the unmanned aerial vehicle 10 lands on a predetermined location and arranges the package. The landing and arrangement of the package may be operated by the operator C, or may automatically be performed by the unmanned aerial vehicle 10. The unmanned aerial vehicle 10, which has arranged the package, takes off again to start to return to the departure location P. The method of flying to the departure location is similar to that of flying to the target location, and the operation authority is transferred when the instruction information from a wireless operation device 20 that is to give the operation authority and the instruction information from the wireless operation device 20 that is to receive the operation authority match each other.

As described above, the unmanned aerial vehicle control system 1 according to the first embodiment transfers the operation authority when pieces of instruction information from the wireless operation devices 20 match each other, to thereby prevent a drastic change in state of the unmanned aerial vehicle 10 to ensure stability of flying by the unmanned aerial vehicle 10. Now, details of this technology are described.

[1-3. Functions to be Implemented in Unmanned Aerial Vehicle Control System]

Figure 5:
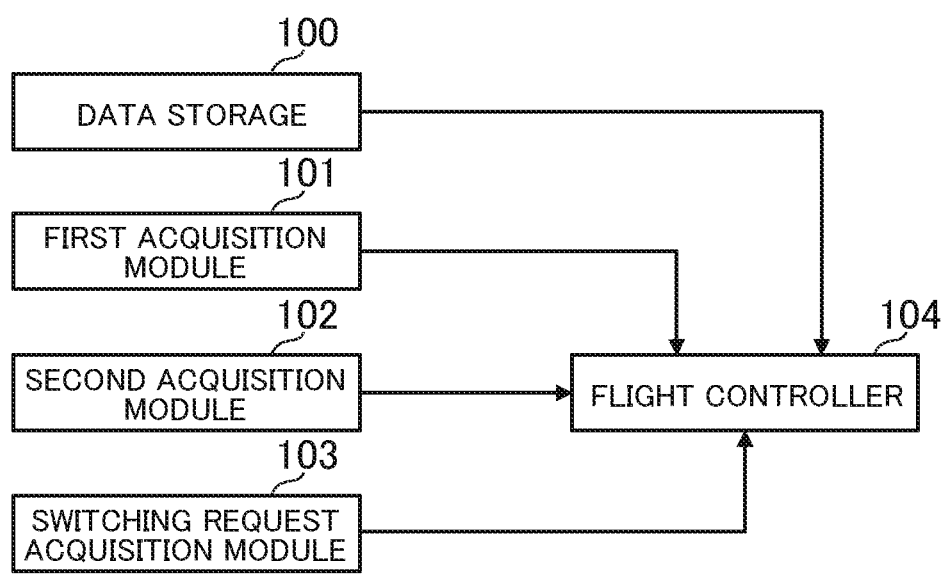
FIG. 5 is a functional block diagram for illustrating an example of functions to be implemented in the unmanned aerial vehicle control system.

FIG. 5 is a functional block diagram for illustrating an example of functions to be implemented in the unmanned aerial vehicle control system 1. As illustrated in FIG. 5, in the unmanned aerial vehicle control system 1, a data storage 100, a first acquisition module 101, a second acquisition module 102, a switching request acquisition module 103, and a flight controller 104 are implemented. In the first embodiment, a description is given of a case in which those functions are implemented in the unmanned aerial vehicle 10.

[1-3-1. Data Storage]

The data storage 100 is mainly implemented by the storage 12. The data storage 100 stores data for controlling the unmanned aerial vehicle 10. For example, the data storage 100 stores operation authority data for identifying the operation authority. In other words, the operation authority data is, for example, data for identifying the wireless operation device 20 holding the operation authority or data for identifying the wireless communicator 130 communicating to/from the wireless operation device 20 holding the operation authority.

FIG. 6 is a table for showing an example of data storage of the operation authority data. As shown in FIG. 6, for example, in the operation authority data, identification information on the wireless communicator 130 and an operation authority flag are associated with each other. The identification information on the wireless communicator 130 is only required to be information enabling identification of the wireless communicator 130, and is, for example, the name, individual identification number, or MAC address of the wireless communicator 130.

The operation authority flag is information for identifying whether or not the operation authority is held, and means, for example, that the operation authority is held when the operation authority flag is on (has a value of 1) and means that the operation authority is not held when the operation authority flag is off (has a value of 0). In the first embodiment, the operation authority is not given to the plurality of wireless operation devices 20 at the same time, and thus the operation authority flag of any one of the wireless communicators 130 is on.

For example, in the example of data storage of FIG. 6, the operation authority flag of the wireless communicator 130A is on, and the operation authority flags of the wireless communicators 130B and 130C are off, and thus the wireless operation device 20A communicating to/from the wireless communicator 130A holds the operation authority. Under this state, for example, when the operation authority is transferred to the wireless operation device 20B, the operation authority flag of the wireless communicator 130A is set on, and the operation authority flag of the wireless communicator 130B is set off.

Data to be stored in the data storage 100 is not limited to the above-mentioned example. The data storage 100 may store data for controlling the unmanned aerial vehicle 10. For example, the data storage 100 may store data indicating a flight path in the case of flight in the autonomous flight mode, or may store positional information on the departure location P and the target location Q.

[1-3-2. First Acquisition Module]

The first acquisition module 101 is mainly implemented by the controller 11. The first acquisition module 101 acquires first information, which is at least one piece of information for operating the unmanned aerial vehicle that is flying or information on a result of detecting an operation of the unmanned aerial vehicle. For example, the first acquisition module 101 may acquire the first information via the communicator 13, or may acquire the first information based on a detection signal from the photographing device 14 or the sensor group 15. As in a second embodiment or fourth embodiment of the present invention described later, when control of the unmanned aerial vehicle 10 that is autonomously flying is switched, the first acquisition module 101 may acquire the first information from an algorithm for controlling autonomous flight.

For example, the information for operating the unmanned aerial vehicle 10 that is flying is instruction information received from the wireless operation device 20, or information indicating details of output to a motor or the like (e.g., number of revolutions of the motor or voltage to be applied to the motor) or an internal command, which is determined based on the instruction information.

Further, for example, the information on the result of detecting the operation of the unmanned aerial vehicle 10 is information indicating, for example, a state (e.g., current position, movement direction, movement speed, altitude, posture, or number of revolutions of the motor) of the unmanned aerial vehicle 10, which is detected by the photographing device 14 or the sensor group 15.

The first information may only be information for operating the unmanned aerial vehicle that is flying or only be information on the result of detecting the operation of the unmanned aerial vehicle, or may include both pieces of information.

In the first embodiment, a description is given of an exemplary case in which the operation authority is transferred from one wireless operation device 20 to another wireless operation device 20. Thus, a description is given of a case in which the first acquisition module 101 acquires first instruction information from a first wireless operation device as the first information when the unmanned aerial vehicle 10 is operating based on the first instruction information. Thus, the description of "first instruction information" in the first embodiment can be replaced with "first information".

The first wireless operation device is a wireless operation device 20 holding the operation authority at the current time point, and is a wireless operation device 20 that is to give the operation authority. In other words, the first wireless operation device can be said to be a wireless operation device 20 communicating to/from the wireless communicator 130 whose operation authority flag is on, a wireless operation device 20 controlling the unmanned aerial vehicle 10, or a wireless operation device 20 whose instruction information is effective.

The first instruction information is instruction information received by the unmanned aerial vehicle 10 from the first wireless operation device. In other words, the first instruction information can be said to be instruction information received via the wireless communicator 130 whose operation authority flag is on, instruction information from the wireless operation device 20 controlling the unmanned aerial vehicle 10, or instruction information effective at the current time point.

In the first embodiment, a description is given of a case in which the first instruction information is instruction information received via the wireless communicator 130 whose operation authority flag is on. Thus, the description of "instruction information" received via the wireless communicator 130 whose operation authority flag is on in the first embodiment can be replaced with "first instruction information".

[1-3-3. Second Acquisition Module]

The second acquisition module 102 is mainly implemented by the controller 11. The second acquisition module 102 acquires second information for operating the unmanned aerial vehicle 10 after control of the unmanned aerial vehicle 10 is switched. For example, the second acquisition module 102 acquires the second information via the communicator 13. As in a third or fourth embodiment of the present invention described later, when the unmanned aerial vehicle 10 autonomously flies after control is switched, the second acquisition module 102 may acquire the second information from the algorithm for controlling autonomous flight.

The phrase "after the control of the unmanned aerial vehicle 10 is switched" refers to becoming a state of controlling the unmanned aerial vehicle 10 based on the second information. In the first embodiment, a description is given of an exemplary case in which the operation authority is transferred from one wireless operation device 20 to another wireless operation device 20, and thus the phrase "after the control of the unmanned aerial vehicle 10 is switched" means a period after the operation authority is transferred.

The meaning of the "information for operating the unmanned aerial vehicle 10" is as described above for the first information, and the second information is not information for operating the unmanned aerial vehicle 10 at the current time point. The second information is different from the first information in that the second information is information (information indicating future operation details) indicating how the unmanned aerial vehicle 10 is operated after switching of control. In the first embodiment, a description is given of an exemplary case in which the operation authority is transferred from one wireless operation device 20 to another wireless operation device 20, and thus the second acquisition module 102 acquires the second instruction information from the second wireless operation device as the second information.

The second wireless operation device is a wireless operation device 20 without the operation authority at the current time point, and is a wireless operation device 20 that is to receive the operation authority. In other words, the second wireless operation device can be said to be a wireless operation device 20 communicating to/from the wireless communicator 130 whose operation authority flag is off, a wireless operation device 20 capable of communicating to/from the unmanned aerial vehicle 10 but not controlling the unmanned aerial vehicle 10, or a wireless operation device 20 capable of transmitting instruction information that is invalid at the current time.

The second instruction information is instruction information received by the unmanned aerial vehicle 10 from the second wireless operation device. In other words, the second instruction information can be said to be instruction information received via the wireless communicator 130 whose operation authority flag is off, instruction information from the wireless operation device 20 capable of communicating to/from the unmanned aerial vehicle 10 but not controlling the unmanned aerial vehicle 10, or instruction information invalid at the current time point.

In the first embodiment, a description is given of a case in which the second instruction information is instruction information received via the wireless communicator 130 whose operation authority flag is off. Thus, the description of "instruction information" received via the wireless communicator 130 whose operation authority flag is off in the first embodiment can be replaced with "second instruction information".

[1-3-4. Switching Request Acquisition Module]

The switching request acquisition module 103 is mainly implemented by the controller 11. The switching request acquisition module 103 receives a switching request from the wireless operation device 20 via the communicator 13. The switching request is a request for switching to control of the unmanned aerial vehicle 10 based on the second information (second instruction information in the first embodiment) acquired from the second acquisition module 102. In the first embodiment, a description is given of an exemplary case in which the operation authority is transferred from one wireless operation device 20 to another wireless operation device 20, and thus the switching request is a request for transferring the operation authority, and is executed by transmitting data in a predetermined format.

The switching request is transmitted when a predetermined operation is performed on the wireless operation device 20. In the first embodiment, a function of requesting for the operation authority is associated with the button B2 of the wireless operation device 20, and thus the switching request is transmitted from the wireless operation device 20 to the unmanned aerial vehicle 10 when the button B2 is pressed. Thus, the switching request is data indicating that the button B2 is pressed, and is the second information indicating that the operation state of the button B2 is on.

[1-3-5. Flight Controller]

The flight controller 104 is mainly implemented by the controller 11. The flight controller 104 restricts switching to control of the unmanned aerial vehicle 10 based on the second information in accordance with the first information and the second information.

The "control of the unmanned aerial vehicle 10 based on the second information" refers to, for example, influencing of the second information on the result of controlling the unmanned aerial vehicle 10. In other words, control of the unmanned aerial vehicle 10 based on the second information refers to the second information being an argument (input) of the algorithm for controlling the unmanned aerial vehicle 10, the unmanned aerial vehicle 10 referring to the second information when determining output to, for example, the motor, or the second information influencing the result of output to, for example, the motor.

The control algorithm is an algorithm for determining output to, for example, the motor, and is also referred to as "controller". For example, the control algorithm is an algorithm for outputting and obtaining the number of revolutions or applied voltage of the motor, with at least one of the second information or a state (e.g., current position, movement direction, movement speed, altitude, posture, or number of revolutions of the motor) of the unmanned aerial vehicle 10 detected by the photographing device 14 or the sensor group 15 serving as an argument.

The term "restrict" means prohibiting control of the unmanned aerial vehicle 10 based on the second information or suppressing control of the unmanned aerial vehicle 10 based on the second information.

The term "prohibit" refers to preventing the second information from influencing the result of controlling the unmanned aerial vehicle 10. In other words, the term "prohibit" refers to avoiding adopting the second information as an argument of the algorithm for controlling the unmanned aerial vehicle 10 (as input to the controller), avoiding referring to the second information when determining output to, for example, the motor by the unmanned aerial vehicle 10, avoiding the second information from influencing the result of output to, for example, the motor, invalidating the second information after reception thereof, or ignoring the second information after reception thereof.

The term "suppress" refers to reducing the degree of influence of the second information on the result of controlling the unmanned aerial vehicle 10. In other words, the term "suppress" refers to adopting the second information as an argument of the algorithm for controlling the unmanned aerial vehicle 10 but reducing a coefficient of the argument, referring to the second information when determining output to, for example, the motor by the unmanned aerial vehicle 10 (enabling the second information) but reducing the effect, or preventing the second information from influencing the result of output to, for example, the motor.

In the first embodiment, "prohibit" is described as one mode of "restrict", and "suppress" is described in Modification Example (5) described later. The description of "prohibit" in the first embodiment can be replaced with "restrict" or "suppress".

The term "switch" refers to changing the method of the controlling the unmanned aerial vehicle 10. In other words, the term "switch" refers to changing information (information source) to be referred to in order to control the unmanned aerial vehicle 10. For example, current control (control method during flight) is changed to control of the unmanned aerial vehicle 10 based on the second information. The current control is, for example, control (manual flight mode) based on the first instruction information described in the first embodiment or autonomous flight control (autonomous flight mode) described in the second embodiment.

In the first embodiment, a description is given of a case in which the operation authority is transferred from one wireless operation device 20 to another wireless operation device 20 as an example of switching, and thus the flight controller 104 restricts switching from control of the unmanned aerial vehicle 10 based on the first instruction information to control of the unmanned aerial vehicle 10 based on the second instruction information.

The "control of the unmanned aerial vehicle 10 based on the first instruction information" refers to a state in which the first wireless operation device holds the operation authority, a state in which the operation authority flag of the wireless communicator 130 communicating to/from the first wireless operation device is on, or a state in which the first instruction information is effective. The "control of the unmanned aerial vehicle 10 based on the second instruction information" refers to a state in which the second wireless operation device holds the operation authority, a state in which the operation authority flag of the wireless communicator 130 communicating to/from the second wireless operation device is on, or a state in which the second instruction information is effective.

Further, in the first embodiment, a description is given of the first instruction information as an example of the first information, and a description is given of the second instruction information as an example of the second information. Thus, the flight controller 104 restricts switching based on the first instruction information and the second instruction information.

For example, the flight controller 104 determines whether or not the first instruction information and the second instruction information have a predetermined relationship, and prohibits control of the unmanned aerial vehicle 10 based on the second instruction information, depending on the result of determination. When it is determined that the first instruction information and the second instruction information have a predetermined relationship, the flight controller 104 does not prohibit control of the unmanned aerial vehicle 10 based on the second instruction information, whereas when it is not determined that the first instruction information and the second instruction information have a predetermined relationship, the flight controller 104 prohibits control of the unmanned aerial vehicle 10 based on the second instruction information.

The term "predetermined relationship" refers to the fact that the first instruction information and the second instruction information match each other, or the fact that the first instruction information and the second instruction information are similar to each other. The term "similar" indicates that details of instructions given by operators are similar to each other, and means, for example, that at least one item of the instruction is the same, the number or proportion of items that have matched is equal to or larger than a threshold value (namely, partial match), or a numerical difference is smaller than a threshold value (e.g., a difference in movement direction is smaller than a predetermined angle or a difference in movement speed is smaller than a predetermined speed).

In the first embodiment, the flight controller 104 restricts switching based on whether or not the first instruction information and the second instruction information match each other. For example, when the first instruction information and the second instruction information match each other, the flight controller 104 does not prohibit control of the unmanned aerial vehicle 10 based on the second instruction information, whereas when the first instruction information and the second instruction information does not match each other, the flight controller 104 prohibits control of the unmanned aerial vehicle 10 based on the second instruction information.

As illustrated in FIG. 3, the instruction information contains a plurality of items, and the flight controller 104 may determine whether or not all the plurality of items match one another or may determine whether or not a part of the plurality of items matches each other. When the flight controller 104 determines whether or not apart of the plurality of items matches each other, the determination may be made for predetermined items. For example, among the items of FIG. 3, the button B1 for turning on/off the power and the button B2 for requesting for the operation authority may be excluded from the determination target.

In the first embodiment, a description is given of a case in which the operation states of operation components other than the button B2 are set to be determination items within the instruction information. Thus, the flight controller 104 determines whether or not the operation states of operation components other than the button B2 within the first instruction information and the operation states of operation components other than the button B2 within the second instruction information match each other, respectively.

In the first embodiment, a description is given of an exemplary case in which the operation authority is transferred by pressing the button B2 to issue a switching request, and thus an unmanned aerial vehicle 10 that is to issue the switching request is not controlled based on the second instruction information, and the flight controller 104 restricts switching when a predetermined switching request for switching to control of the unmanned aerial vehicle 10 based on the second instruction information is acquired.

The operation authority may be transferred automatically when the first instruction information and the second instruction information match each other. However, in the first embodiment, as described above, the operation authority is transferred on condition that a switching request is acquired without the operation authority being automatically transferred even when the first instruction information and the second instruction information match each other.

[1-4. Processing to be Executed in Unmanned Aerial Vehicle Control System]

Figure 7:
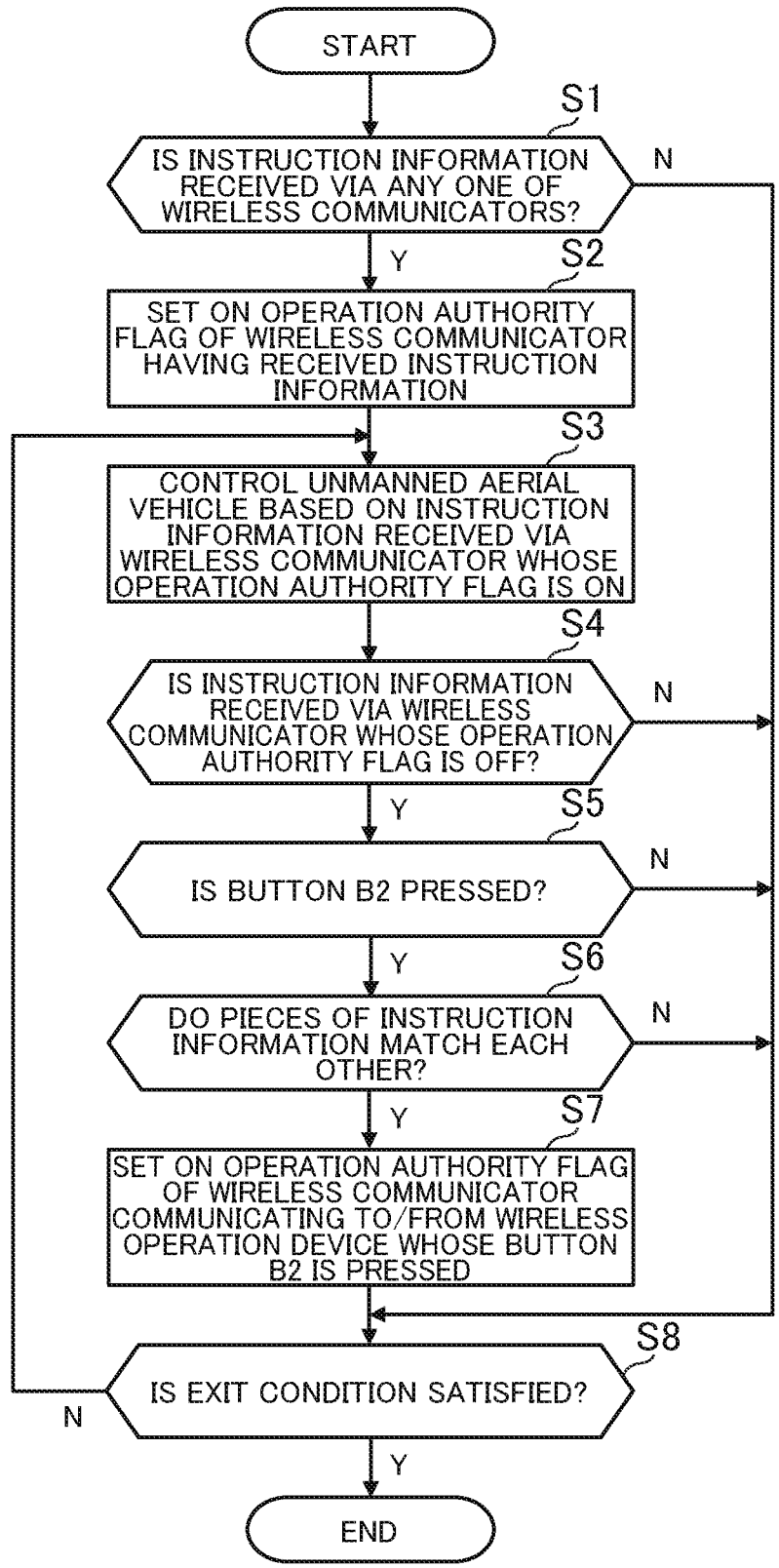
FIG. 7 is a flowchart for illustrating an example of processing to be executed in the unmanned aerial vehicle control system.

FIG. 7 is a flowchart for illustrating an example of processing to be executed in the unmanned aerial vehicle control system 1. In the first embodiment, a description is given of a case in which the unmanned aerial vehicle 10 executes the processing illustrated in FIG. 7. For example, the processing illustrated in FIG. 7 is executed by the controller 11 operating in accordance with a program stored in the storage 12.

In the first embodiment, processing described below is an example of processing to be implemented by the functional blocks illustrated in FIG. 5. The processing described below is executed after the power of the unmanned aerial vehicle 10 is turned on. Further, it is assumed that the operation authority flags are all set off as an initial value of the operation authority data.

As illustrated in FIG. 7, first, the controller 11 determines whether or not instruction information is received from the wireless operation device 20 via any one of the wireless communicators 130 (Step S1). The instruction information is transmitted in the format illustrated in FIG. 3, and thus, in Step S1, the controller 11 determines whether or not information on the format is received. When it is not determined that instruction information is received via any one of the wireless communicators 130 (Step S1: N), the processing proceeds to processing of Step S8 described later. In this case, the unmanned aerial vehicle 10 is not capable of communicating to/from any one of the wireless operation devices 20, and thus does not start to fly toward the target location Q.

On the contrary, when it is determined that instruction information is received via anyone of the wireless communicators 130 (Step S1: Y), the controller 11 sets the operation authority flag of the wireless communicator 130 on (Step S2). In Step S2, the controller 11 sets on the operation authority flag of a record storing identification information on a wireless communicator 130 that has received the instruction information, within the operation authority data. With this, the instruction information received via the wireless communicator 130 becomes effective, and the operation authority is given to the wireless operation device 20 transmitting the instruction information.

The controller 11 controls the unmanned aerial vehicle 10 based on the instruction information received via the wireless communicator 130 whose operation authority flag is on (Step S3). In Step S3, the controller 11 controls the unmanned aerial vehicle 10 based on a value of each item included in the instruction information. For example, when the instruction information indicates the fact that the button B3 is on, the unmanned aerial vehicle 10 flies in the autonomous flight mode. In this case, the controller 11 determines output to each motor so that the positional information detected by the GPS sensor 15 follows a predetermined path. The information indicating the path in the autonomous flight mode may be stored in the storage 12 in advance, or may be acquired from another computer via the communicator 13.

The controller 11 determines whether or not instruction information is received via the wireless communicator 130 whose operation authority flag is off (Step S4). In Step S4, similarly to Step S1, the controller 11 determines whether or not information having a predetermined format has been received. When it is not determined that instruction information is received via the wireless communicator 130 whose operation authority flag is off (Step S4: N), the processing proceeds to the processing of Step S8 described later. In this case, the processing of Step S7 is not executed, and thus the operation authority is not transferred.

On the contrary, when it is determined that instruction information is received via the wireless communicator 130 whose operation authority flag is off (Step S4: Y), the controller 11 refers to the received instruction information, and determines whether or not the button B2 for transferring the operation authority is pressed (Step S5). In Step S5, the controller 11 determines whether or not the switching request is received by referring to the operation state of the button B2 of the instruction information. When it is not determined that the button B2 is pressed (Step S5: N), the processing proceeds to the processing of Step S8 described later. In this case, the processing of Step S7 is not executed, and thus the operation authority is not transferred.

On the contrary, when it is determined that the button B2 is pressed (Step S5: Y), the controller 11 determines whether or not the instruction information (first instruction information) received via the wireless communicator 130 whose operation authority flag is on and the instruction information received in Step S4 (namely, the second instruction information received via the wireless communicator 130 whose operation authority flag is off) match each other (Step S6). As described above, in Step S6, it is determined whether or not the operation states of items other than the button B2 within the second instruction information match each other. When it is not determined that pieces of the instruction information match each other (Step S6: N), the processing proceeds to the processing of Step S8 described later. In this case, the processing of Step S7 is not executed, and thus the operation authority is not transferred.

On the contrary, when it is determined that pieces of the instruction information match each other (Step S6: Y), the controller 11 sets on the operation authority flag of the wireless communicator 130 (wireless communicator 130 having received the instruction information in Step S4) communicating to/from the wireless operation device 20 whose button B2 is pressed (Step S7). In Step S7, the controller 11 changes, to on, the operation authority flag of a record storing identification information on the wireless communicator 130 having received the instruction information within the operation authority data, and changes, to off, the operation authority flag that has been on. With this, the instruction information received via the wireless communicator 130 becomes effective, and the instruction information that has been effective so far becomes ineffective.

The controller 11 determines whether or not a predetermined exit condition is satisfied (Step S8). The exit condition is only required to be a condition defined to end the processing, and may be, for example, a condition that the unmanned aerial vehicle 10 has arrived at the target location or departure location, or may be a condition that the unmanned aerial vehicle 10 has landed. When it is not determined that the exit condition is satisfied (Step S8: N), the processing returns to the processing of Step S3. When it is determined that the exit condition is satisfied (Step S8: Y), the processing is finished.

With the unmanned aerial vehicle control system 1 described above, the second information is not automatically reflected in the motion of the unmanned aerial vehicle 10, and when the stability of the unmanned aerial vehicle 10 may not be ensured due to reflection of the second information, switching to control of the unmanned aerial vehicle 10 based on the second information can be restricted to ensure the stability of flying by the unmanned aerial vehicle 10.

Further, it is possible to effectively improve the stability of flight in the case of transferring the operation authority by restricting switching from control based on the first instruction information on the first wireless operation device to control based on the second instruction information on the second wireless operation device. Further, for example, the operation authority can be transferred while ensuring the stability of flight even without causing the unmanned aerial vehicle 10 to hover, and thus the unmanned aerial vehicle 10 is not required to hover excessively. As a result, it is possible to prevent the unmanned aerial vehicle 10 from consuming energy excessively, or enable the unmanned aerial vehicle 10 to arrive at the target location Q more quickly.

Further, it is possible to ensure the stability of flying by the unmanned aerial vehicle 10 in a case where there are a plurality of wireless operation devices 20 by restricting switching to control of the unmanned aerial vehicle 10 based on the second instruction information in accordance with the first instruction information on the first wireless operation device and the second instruction information on the second wireless operation device.

Further, it is possible to effectively improve the stability of flying by the unmanned aerial vehicle 10 by restricting switching to control of the unmanned aerial vehicle 10 based on the second instruction information depending on whether or not the first instruction information on the first wireless operation device and the second instruction information on the second wireless operation device match each other.

Further, it is possible to prevent flight control from switching at a timing not intended by the operator and the operator from being confused, by transferring the operation authority when a predetermined switching request is issued. As a result, it is possible to effectively improve the stability of flying by the unmanned aerial vehicle 10.

Further, through implementation of the first acquisition module 101, the second acquisition module 102, and the flight controller 104 in the unmanned aerial vehicle 10, the unmanned aerial vehicle 10 can be used as a hub and the unmanned aerial vehicle 10 can determine, for example, whether the first information and the second information match each other even under an environment in which the wireless operation devices 20 cannot communicate to/from each other.

2. Second Embodiment

Figure 8:
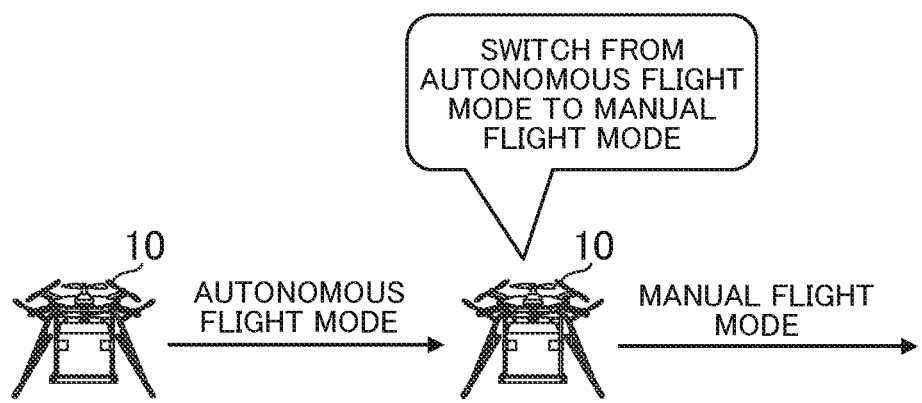
FIG. 8 is an explanatory diagram for illustrating an outline of a second embodiment of the present invention.
Figure 8:

Next, a description is given of an unmanned aerial vehicle control system 1 according to another embodiment of the present invention. FIG. 8 is an explanatory diagram for illustrating an outline of the second embodiment. In the first embodiment, a description has been given of a case in which the operation authority is transferred from one wireless operation device 20 to another wireless operation device 20. However, as illustrated in FIG. 8, the processing in an embodiment of the present invention may also be applied to a case of switching from the autonomous flight mode to the manual flight mode, to thereby prevent a drastic change in unmanned aerial vehicle 10.

In the second embodiment, the description is based on the assumption that there is one wireless operation device 20 included in the unmanned aerial vehicle control system 1, but similarly to the first embodiment, there may be a plurality of wireless operation devices 20. In the following, the description of the same configuration as that of the first embodiment is omitted. This holds true also for the third and fourth embodiments described later.

The functional block diagram of the second embodiment is similar to that of the first embodiment, but details of processing are different from those of the first embodiment. In the second embodiment, the unmanned aerial vehicle 10 is flying autonomously, and thus, for example, the flight controller 104 causes the unmanned aerial vehicle 10 to fly autonomously based on the algorithm for controlling autonomous flight. For example, the flight controller 104 causes the unmanned aerial vehicle 10 to fly autonomously based on flight path data stored in the data storage 100. For example, the flight controller 104 causes the unmanned aerial vehicle 10 to fly so that the unmanned aerial vehicle 10 flies on a flight path indicated by flight path data based on the positional information detected by the GPS sensor 150. The flight controller 104 determines a movement direction and details of output to each motor based on the positional information on the unmanned aerial vehicle 10 and the flight path indicated by the flight path data.

The flight controller 104 restricts switching from autonomous flight control to control of the unmanned aerial vehicle 10 based on the instruction information. The autonomous flight control is control in the autonomous flight mode, and is a state in which the flight controller 104 executes flight control based on the flight path data. In other words, the autonomous flight control is flight control to be executed without referring to the instruction information given by the wireless operation device 20. The meanings of the terms "switch" and "restrict" are as described above in the first embodiment. In the following, similarly to the first embodiment, "prohibit" is described as an example of "restrict".

For example, the first information is information on at least one of a flight path in a case where the unmanned aerial vehicle 10 is caused to fly autonomously or a state of the unmanned aerial vehicle 10. The information on the flight path indicates a path on which the unmanned aerial vehicle 10 is to fly autonomously, and is stored in the flight path data, for example. The flight path is indicated by coordinate information on the path, for example. The state of the unmanned aerial vehicle 10 is only required to be a state of the operation of the unmanned aerial vehicle 10, and may be an opening/closing state of the mechanism for holding a package or an opening/closing state of the safety mechanism in addition to a flight state such as the movement direction or movement speed. The first information may indicate only the flight path in the case where the unmanned aerial vehicle 10 is caused to fly autonomously, indicate only the state of the unmanned aerial vehicle 10, or indicate both thereof.

In the second embodiment, a description is given of an exemplary case in which the first information is information on at least one of the movement direction or movement speed of the unmanned aerial vehicle 10 that is autonomously flying. The first information may be information only on the movement direction, information only on the movement speed, or information on both thereof. For example, the movement direction of the unmanned aerial vehicle 10 is indicated by a vector or a direction. Further, for example, the movement speed of the unmanned aerial vehicle 10 may be indicated by a numerical value indicating the speed, or may be indicated by a value relating to output to the motor.

As described above in the first embodiment, the first information may be acquired from the algorithm for controlling autonomous flight, or may be acquired based on a detection signal from the photographing device 14 or the sensor group 15. Various kinds of publicly-known techniques can be applied to the method of identifying the movement direction or movement speed of the unmanned aerial vehicle 10.

For example, the first acquisition module 101 may identify at least one of the movement direction or the movement speed based on the change in subject of the image photographed by the photographing device 14. In this case, the first acquisition module 101 identifies the movement direction from a directional change in characteristic point of the subject, or identifies the movement speed from an amount of change in characteristic point of the subject. A direction detected by a direction sensor of the sensor group 15 may auxiliarly be used as the movement direction.

Further, for example, the first acquisition module 101 may identify at least one of the movement direction or movement speed based on the change in positional information detected by the GPS sensor 150. In this case, the first acquisition module 101 identifies the movement direction from a directional change in position indicated by the positional information, or identifies the movement speed from an amount of change in position indicated by the positional information. Further, for example, the first acquisition module 101 may detect a positional change based on detection signals from the acceleration sensor and gyro sensor of the sensor group 15 to identify at least one of the movement direction or movement speed.

Similarly to the first embodiment, the second acquisition module 102 acquires instruction information from the wireless operation device 20 as the second information. Thus, the description of "instruction information" in the second embodiment can be replaced with "second information". Further, in the second embodiment, a description is given of an exemplary case in which the instruction information is information on at least one of the direction or speed specified for the unmanned aerial vehicle 10. The instruction information may be information only on the specified direction, information only on the specified speed, or may be information on both thereof. For example, the specified direction of the unmanned aerial vehicle 10 may be indicated by a vector or a direction, or may be indicated by the direction of tilting the stick ST. Further, for example, the specified speed of the unmanned aerial vehicle 10 may be indicated by a numerical value indicating the speed, or may be indicated by the angle of tilting the stick ST.

As described above in the first embodiment, the instruction information is acquired via the communicator 13. For example, the wireless operation device 20 identifies at least one of the specified direction or specified speed based on the operation states of operation components of the operation device 24. It is assumed that a relationship between the operation state and the specified direction and specified speed is stored in the storage 22 in advance. For example, the relationship between the direction of tilting the stick ST and the specified direction is stored in the storage 22. Further, for example, the relationship between the direction of tilting the stick ST and the specified speed is stored in the storage 22.

The wireless operation device 20 identifies at least one of the specified direction or specified speed associated with the operation state of an operation component of the operation device 24, and generates instruction information based on the result of identification for transmission to the unmanned aerial vehicle 10. For example, the wireless operation device 20 identifies the specified direction associated with the direction of tilting the stick ST, and generates the instruction information indicating the specified direction for transmission to the unmanned aerial vehicle 10. Further, for example, the wireless operation device 20 identifies the specified speed associated with the angle of tilting the stick ST, and generates the instruction information indicating the specified speed for transmission to the unmanned aerial vehicle 10.

For example, the flight controller 104 determines whether or not the first information and the instruction information have a predetermined relationship, and prohibits switching based on the result of determination. When it is determined that the first information and the instruction information have a predetermined relationship, the flight controller 104 does not prohibit switching, whereas when it is not determined that the first information and the instruction information have a predetermined relationship, the flight controller 104 prohibits switching.

The term "predetermined relationship" refers to the fact that the first information and the instruction information match each other, or the fact that the first information and the instruction information are similar to each other. The term "similar" indicates that a value of the first information and a value of the instruction information are similar to each other, and means, for example, that at least one item of the instruction is the same, the number or proportion of items that have matched is equal to or larger than a threshold value (namely, partial match), or a numerical difference is smaller than a threshold value (e.g., a difference in movement direction is smaller than a predetermined angle or a difference in movement speed is smaller than a predetermined speed).

For example, the flight controller 104 restricts switching based on whether or not the movement direction indicated by the first information and the specified direction indicated by the instruction information match each other. The flight controller 104 does not prohibit switching when the movement direction and the specified direction match each other, whereas the flight controller 104 prohibits switching when the movement direction and the specified direction do not match each other. Further, for example, the flight controller 104 restricts switching based on whether or not a deviation (angle) between the movement direction indicated by the first information and the specified direction indicated by the instruction information is smaller than a threshold value. The flight controller 104 does not prohibit switching when the deviation is smaller than the threshold value, whereas the flight controller 104 prohibits switching when the deviation is equal to or larger than the threshold value.

Further, for example, the flight controller 104 restricts switching based on whether or not the movement speed indicated by the first information and the specified speed indicated by the instruction information match each other. The flight controller 104 does not prohibit switching when the movement speed and the specified speed match each other, whereas the flight controller 104 prohibits switching when the movement speed and the specified speed do not match each other. Further, for example, the flight controller 104 restricts switching based on whether or not a difference between the movement speed indicated by the first information and the specified speed indicated by the instruction information is smaller than a threshold value. The flight controller 104 does not prohibit switching when the difference is smaller than the threshold value, whereas the flight controller 104 prohibits switching when the difference is equal to or larger than the threshold value.

The processing of the flight controller 104 is not limited to the above-mentioned example. For example, the first information may be information on opening/closing of the mechanism for holding a package of the unmanned aerial vehicle 10, and the instruction information may be information on opening/closing of the holding mechanism input to the wireless operation device 20, and the flight controller 104 may restrict switching based on whether or not pieces of information on opening/closing of the holding mechanism match each other. A publicly-known opening/closing sensor may be included in the sensor group 15, and the opening/closing sensor may detect opening/closing of the holding mechanism.

For example, the flight controller 104 may determine whether or not the instruction information indicates "closing" of the holding mechanism when the first information indicates "closing" of the holding mechanism, and may prohibit switching when the instruction information indicates "opening" of the holding mechanism and allow switching when the instruction information indicates "closing" of the holding mechanism. With this, it is possible to prevent dropping of a package due to an operation failure caused by the operator. When the first information indicates "opening" of the holding mechanism, there is no package, and thus determination of opening/closing of the holding mechanism may not be performed.

In this description, opening/closing of the holding mechanism is given as an example, but the flight controller 104 may restrict switching based on whether or not pieces of information on opening/closing of the safety mechanism match each other. With this, it is possible to prevent a parachute from opening due to an operation failure caused by the operator. Opening/closing of the safety mechanism may also be detected by the opening/closing sensor.

Further, for example, when the first information indicates the positional information on the unmanned aerial vehicle 10 and the instruction information indicates the specified direction given by the operator, the flight controller 104 may prohibit switching when the instruction information is such instruction information as to cause the unmanned aerial vehicle 10 to fly toward a prohibited direction corresponding to the positional information on the unmanned aerial vehicle 10. In this case, it is assumed that a relationship between the position and the prohibited direction is stored in the data storage 100. The prohibited direction is only required to be a direction in which flight is prohibited, and may be, for example, a direction in which there is an obstacle from the viewpoint of a certain position, or may be a direction toward a place at which a gust of wind is likely to blow. Instead of the prohibited direction, a direction in which flight is allowed may be defined.

The flight controller 104 identifies the prohibited direction associated with a position indicated by the positional information on the unmanned aerial vehicle 10, and determines whether or not the prohibited direction and the specified direction match each other. The flight controller 104 does not prohibit switching when the prohibited direction and the specified direction do not match each other, whereas the flight controller 104 prohibits switching when the prohibited direction and the specified direction match each other. Further, for example, the flight controller 104 restricts switching based on whether or not a deviation (angle) between the prohibited direction and the specified direction is smaller than a threshold value. The flight controller 104 does not prohibit switching when the deviation is equal to or larger than the threshold value, whereas the flight controller 104 prohibits switching when the deviation is smaller than the threshold value.

With the unmanned aerial vehicle control system 1 according to the second embodiment, it is possible to effectively improve the stability of flight in the case of switching control, by restricting switching from autonomous flight control to control based on the instruction information from the wireless operation device 20. Further, for example, it is possible to switch from the autonomous flight mode to the manual flight mode while ensuring the stability of flight even without causing the unmanned aerial vehicle 10 to hover. Thus, the unmanned aerial vehicle 10 is not required to hover excessively. As a result, it is possible to prevent the unmanned aerial vehicle 10 from consuming excessive energy, and enable the unmanned aerial vehicle 10 to reach the target location Q more quickly.

Further, switching is restricted based on at least one of the movement direction or movement speed of the unmanned aerial vehicle 10 and at least one of the direction or speed specified for the unmanned aerial vehicle 10, to thereby be able to restrict switching in a case where the specified direction is greatly different from the current movement direction of the unmanned aerial vehicle 10, or restrict switching in a case where the specified speed is greatly different from the current movement speed of the unmanned aerial vehicle 10, for example. As a result, it is possible to effectively improve the stability of flight. That is, it is possible to prevent the unmanned aerial vehicle 10 from losing its balance by turning abruptly, starting abruptly, or applying braking abruptly.

Further, through use of, as the first information, information on the flight path for autonomous flight or information on a result of detecting the state of the unmanned aerial vehicle 10 that is autonomously flying, it is possible to ensure the stability of flying by the unmanned aerial vehicle 10 in a case where the autonomous flight mode is switched to the manual flight mode.

In the second embodiment, the unmanned aerial vehicle 10 may fly in the manual flight mode before the autonomous flight mode. That is, a first manual flight mode may be switched to a second manual flight mode after temporarily being switched to the autonomous flight mode. In other words, the autonomous flight mode may be set between the first manual flight mode and the second manual flight mode. Now, a description is given of a modification example of the second embodiment.

For example, the unmanned aerial vehicle 10 switches from the first manual flight mode based on the instruction information from the wireless operation device 20A to the autonomous flight mode, and then switches to the second manual flight mode based on the instruction information from the wireless operation device 20B. In this case, the processing of the second embodiment may be applied, and switching from the autonomous flight mode to the second manual flight mode may be restricted.

For example, the unmanned aerial vehicle 10 is operating based on the first instruction information from the first wireless operation device (e.g., wireless operation device 20A) before autonomous flight. Flight control at this time is as described above in the first embodiment. The term "before autonomous flight" refers to time before switching to the autonomous flight mode.

Further, for example, the unmanned aerial vehicle 10 switches from control of the unmanned aerial vehicle based on the first instruction information to the autonomous flight control. As described in the third embodiment of the present invention described later, switching from the first manual flight mode to the autonomous flight mode may be restricted, or such restriction as in the third embodiment may not be particularly performed at the time of switching from the first manual flight mode to the autonomous flight mode. The first manual flight mode may be switched to the autonomous flight mode when the first wireless operation device has transmitted a switching request, or the first manual flight mode may be switched to the autonomous flight mode when a predetermined condition is satisfied within the unmanned aerial vehicle 10. For example, the first manual flight mode may be switched to the autonomous flight mode when the unmanned aerial vehicle 10 has moved to a predetermined position, or the first manual flight mode may be switched to the autonomous flight mode depending on, for example, the strength of wind detected by the sensor group 15.

For example, when the first manual flight mode is switched to the autonomous flight mode, the flight controller 104 may maintain the movement speed and movement direction at the current time point (namely, time point at which the first manual flight mode is switched to the autonomous flight mode), or the current speed and movement direction may gradually be changed to a movement speed and movement direction determined based on an autonomous flight algorithm. Further, for example, the flight controller 104 may determine the movement speed and movement direction based on the autonomous flight algorithm without particularly considering the movement speed and movement direction in the first manual flight mode.

The second acquisition module 102 in this modification example acquires the second instruction information from the second wireless operation device (e.g., wireless operation device 20B) as the second information, and the flight controller 104 restricts switching from the autonomous flight control to control of the unmanned aerial vehicle based on the second instruction information. This processing is as described above in the second embodiment.

With the modification example described above, the autonomous flight mode is set between the first manual flight mode and the second manual flight mode, to thereby be able to switch between manual flight modes while ensuring the stability of flight even without causing the unmanned aerial vehicle 10 to hover. Thus, the unmanned aerial vehicle 10 is not required to hover excessively. As a result, it is possible to prevent the unmanned aerial vehicle 10 from consuming excessive energy, and enable the unmanned aerial vehicle 10 to reach the target location Q more quickly.

3. Third Embodiment

Figure 9:
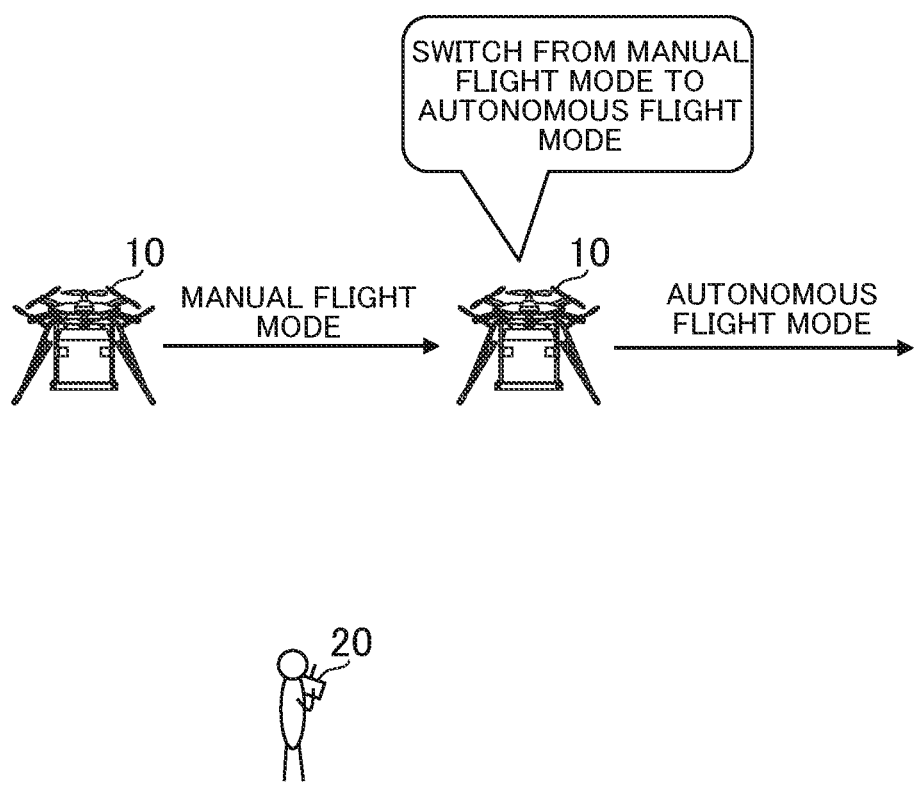
FIG. 9 is an explanatory diagram for illustrating an outline of a third embodiment of the present invention.

Next, a description is given of an unmanned aerial vehicle control system 1 according to another embodiment of the present invention. FIG. 9 is an explanatory diagram for illustrating an outline of the third embodiment. As illustrated in FIG. 9, the processing in an embodiment of the present invention may also be applied to a case of switching from the manual flight mode to the autonomous flight mode, to thereby prevent a drastic change in unmanned aerial vehicle 10.

The functional block diagram of the third embodiment is similar to those of the first and second embodiments, but details of the processing are different from those of the first and second embodiments. In the third embodiment, the unmanned aerial vehicle 10 is operating based on the instruction information from the wireless operation device 20, and thus a flight control method to be executed before switching of control is similar to that described in the first embodiment.

The first information in the third embodiment is similar to the first information in the first embodiment. For example, the first information may be information on at least one of the movement direction or movement speed of the unmanned aerial vehicle 10 flying based on the instruction information. The first information may be information only on the movement direction, information only on the movement speed, or information on both thereof.

In the third embodiment, the second information is information for causing the unmanned aerial vehicle 10 to fly autonomously. Thus, the second information in the third embodiment is similar to the first information in the second embodiment, and is information on at least one of the movement direction or movement speed in a case where the unmanned aerial vehicle is caused to fly autonomously. Thus, the second information in the third embodiment is similar to the first information in the second embodiment, and for example, the second information is information on at least one of the movement direction or movement speed in the case where the unmanned aerial vehicle is caused to fly autonomously. The second information may be information only on the movement direction, information only on the movement speed, or information on both thereof.

Further, for example, the second information is information on at least one of a flight path in the case where the unmanned aerial vehicle is caused to fly autonomously or the state of the unmanned aerial vehicle 10. The second information may be information only on the flight path, information only on the state of the unmanned aerial vehicle 10, or information on both thereof.

The flight controller 104 restricts switching from control of the unmanned aerial vehicle 10 based on the instruction information to the autonomous flight control. For example, the flight controller 104 determines whether or not the first information and the second information have a predetermined relationship, and prohibits switching based on the result of determination. The flight controller 104 does not prohibit switching when it is determined that the first information and the second information have a predetermined relationship, whereas the flight controller 104 prohibits switching when it is not determined that the first information and the second information have a predetermined relationship. The meaning of the term "predetermined relationship" is as described above in the second embodiment, and "instruction information" in the description of the second embodiment may be replaced with "second information".

For example, the flight controller 104 restricts switching based on whether or not the movement direction indicated by the first information and the movement direction indicated by the second information match each other. The flight controller 104 does not prohibit switching when the movement direction indicated by the first information and the movement direction indicated by the second information match each other, whereas the flight controller 104 prohibits switching when the movement direction indicated by the first information and the movement direction indicated by the second information do not match each other. Further, for example, the flight controller 104 restricts switching based on whether or not a deviation (angle) between the movement direction indicated by the first information and the movement direction indicated by the second information is smaller than a threshold value. The flight controller 104 does not prohibit switching when the deviation is smaller than the threshold value, whereas the flight controller 104 prohibits switching when the deviation is equal to or larger than the threshold value.

Further, for example, the flight controller 104 restricts switching based on whether or not the movement speed indicated by the first information and the movement speed indicated by the second information match each other. The flight controller 104 does not prohibit switching when the movement speed indicated by the first information and the movement speed indicated by the second information match each other, whereas the flight controller 104 prohibits switching when the movement speed indicated by the first information and the movement speed indicated by the second information do not match each other. Further, for example, the flight controller 104 restricts switching based on whether or not a difference between the movement speed indicated by the first information and the movement speed indicated by the second information is smaller than a threshold value. The flight controller 104 does not prohibit switching when the difference is smaller than the threshold value, whereas the flight controller 104 prohibits switching when the difference is equal to or larger than the threshold value.

The processing of the flight controller 104 is not limited to the above-mentioned example. For example, each of the first information and the second information may be information on opening/closing of the mechanism for holding a package of the unmanned aerial vehicle 10, and similarly to the second embodiment, the flight controller 104 may restrict switching based on whether or not pieces of information on opening/closing of the holding mechanism match each other. Further, similarly to the second embodiment, switching may be restricted based on whether or not pieces of information on opening/closing of the safety mechanism match each other, and may be restricted based on the prohibited direction corresponding to the positional information.

With the unmanned aerial vehicle control system 1 according to the third embodiment, it is possible to effectively improve the stability of flight in the case of switching control, by restricting switching from control based on the instruction information from the wireless operation device 20 to the autonomous flight control. Further, for example, it is possible to switch from the manual flight mode to the autonomous flight mode while ensuring the stability of flight even without causing the unmanned aerial vehicle 10 to hover. Thus, the unmanned aerial vehicle 10 is not required to hover excessively. As a result, it is possible to prevent the unmanned aerial vehicle 10 from consuming excessive energy, and enable the unmanned aerial vehicle 10 to reach the target location Q more quickly.

Further, switching is restricted based on at least one of the movement direction or movement speed of the unmanned aerial vehicle 10, to thereby be able to restrict switching in a case where a direction greatly different from the current movement direction of the unmanned aerial vehicle 10 is specified by the autonomous flight control, or restrict switching in a case where a speed greatly different from the current movement speed of the unmanned aerial vehicle 10 is specified by the autonomous flight control, for example. As a result, it is possible to effectively improve the stability of flight. That is, it is possible to prevent the unmanned aerial vehicle 10 from losing its balance by turning abruptly, starting abruptly, or applying braking abruptly.

Further, through use of, as the second information, information on the flight path for autonomous flight or information on a result of detecting the state of the unmanned aerial vehicle 10 that is autonomously flying, it is possible to ensure the stability of flying by the unmanned aerial vehicle 10 in a case where the manual flight mode is switched to the autonomous flight mode.

4. Fourth Embodiment

Figure 10:
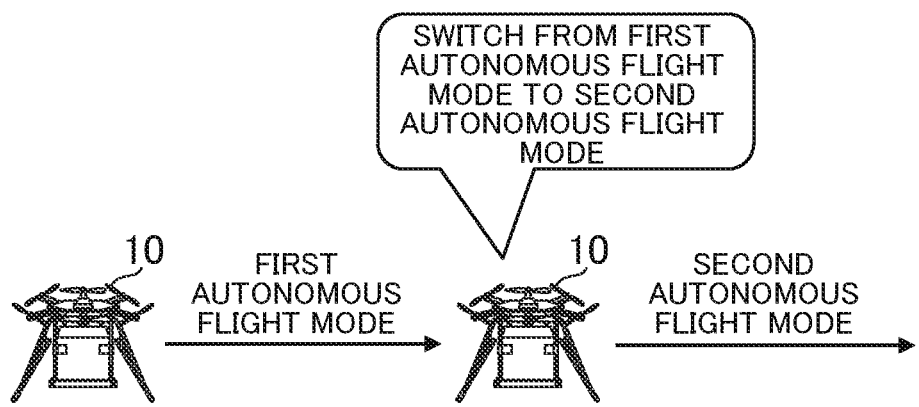
FIG. 10 is an explanatory diagram for illustrating an outline of a fourth embodiment of the present invention.
Figure 10:

Next, a description is given of an unmanned aerial vehicle control system 1 according to another embodiment of the present invention. FIG. 10 is an explanatory diagram for illustrating an outline of the fourth embodiment of the present invention. As illustrated in FIG. 10, there are a plurality of autonomous flight modes, and the processing in an embodiment of the present invention may also be applied to a case of switching from a first autonomous flight mode to a second autonomous flight mode, to thereby prevent a drastic change in the unmanned aerial vehicle 10.

The first autonomous flight mode and the second autonomous flight mode are different autonomous flight modes, and for example, the control algorithm itself may be different, or set information (e.g., coefficients, arguments, or expressions to be used in the control algorithm) may be different under the same control algorithm. For example, flight control may be executed based on a first control algorithm in the first autonomous flight mode, and flight control may be executed based on a second control algorithm in the second autonomous flight mode. Further, for example, flight control may be executed based on first set information in the first autonomous flight mode, and flight control may be executed based on second set information in the second autonomous flight mode.

For example, the first autonomous flight mode may be a normal flight mode, and the second autonomous flight mode may be a posture maintenance mode. In contrast, the first autonomous flight mode may be the posture maintenance mode, and the second autonomous flight mode may be the normal flight mode.

For example, the normal flight mode is a flight mode in which flight on a predetermined path toward a target location is prioritized, and has a higher movement speed than that of the posture flight mode. The normal flight mode may be used when no wind or gentle wind blows, for example, or may be used when the weather is sunny, for example.

Further, for example, the posture maintenance mode is a flight mode in which maintaining a posture is prioritized in consideration of wind, and responds to wind (external force) more quickly than in the normal flight mode. The posture maintenance mode may be used when strong wind blows, for example, or may be used when the weather is rainy, for example. The term "respond" is control of returning to the original posture when the posture has changed. For example, when proportional-integral-differential (PID) control is used for posture control in the flight algorithm, an I value (coefficient in integral control, which is used for an operation of removing a difference from a target value) of the posture maintenance mode may be set to be smaller than an I value of the normal flight mode, to thereby perform control of immediately returning to an original posture when the posture has changed. Further, for example, a P value (coefficient in proportional control, which is a coefficient for performing an operation proportional to the magnitude of a difference with a target value) of the posture maintenance mode may be set to be larger than a P value of the normal flight mode. Further, for example, a D value (coefficient in differential control, which is a coefficient for performing an operation of suppressing a change) of the posture maintenance mode may be set to be larger than a D value of the normal flight mode.

In the fourth embodiment, a plurality of autonomous flight modes are only required to be prepared, and the autonomous flight mode is not limited to the normal flight mode and the posture maintenance mode. For example, when the unmanned aerial vehicle 10 flies autonomously based on an instruction from an external computer, the first autonomous flight mode may correspond to autonomous flight based on an instruction from a first computer, and the second autonomous flight mode may correspond to autonomous flight based on an instruction from a second computer.

The functional block diagram of the fourth embodiment is similar to those of the first to third embodiments, but details of the processing are different from those of the first to third embodiments. In the fourth embodiment, the unmanned aerial vehicle 10 flies autonomously based on first autonomous flight control, and thus a flight control method before switching of control is similar to that described in the second embodiment.

The first information in the fourth embodiment is similar to the first information in the second embodiment. For example, the first information may be information on at least one of the movement direction or movement speed of the unmanned aerial vehicle 10 that is autonomously flying under the first autonomous flight control. Further, for example, the first information may be information on at least one of a flight path of the unmanned aerial vehicle 10 that is autonomously flying under the first autonomous flight control or the state of the unmanned aerial vehicle 10. Details of those pieces of information are as described above in the second embodiment.

The second information in the fourth embodiment is similar to the second information in the third embodiment. The second information is information for causing the unmanned aerial vehicle 10 to fly autonomously based on second autonomous flight control. For example, the second information may be information on at least one of the movement direction or movement speed in a case where the unmanned aerial vehicle 10 is caused to fly autonomously under the second autonomous flight control. Further, for example, the second information may be information on at least one of a flight path in the case where the unmanned aerial vehicle 10 is caused to fly autonomously under the second autonomous flight control or the state of the unmanned aerial vehicle 10. Details of those pieces of information are as described above in the third embodiment.

The flight controller 104 restricts switching from the first autonomous flight control to the second autonomous flight control. For example, the flight controller 104 determines whether or not the first information and the second information have a predetermined relationship, and prohibits switching based on the result of determination. The flight controller 104 does not prohibit switching when it is determined that the first information and the second information have a predetermined relationship, whereas the flight controller 104 prohibits switching when it is not determined that the first information and the second information have a predetermined relationship. The meaning of the term "predetermined relationship" is as described above in the second embodiment, and "instruction information" in the description of the second embodiment may be replaced with "second information".

For example, the flight controller 104 restricts switching based on whether or not the movement direction in the first autonomous flight control and the movement direction in the second autonomous flight control match each other. The flight controller 104 does not prohibit switching when those movement directions match each other, whereas the flight controller 104 prohibits switching when those movement directions do not match each other. Further, for example, the flight controller 104 restricts switching based on whether or not a deviation (angle) between the movement direction in the first autonomous flight control and the movement direction in the second autonomous flight control is smaller than a threshold value. The flight controller 104 does not prohibit switching when the deviation is smaller than the threshold value, whereas the flight controller 104 prohibits switching when the deviation is equal to or larger than the threshold value.

Further, for example, the flight controller 104 restricts switching based on whether or not the movement speed in the first autonomous flight control and the movement speed in the second autonomous flight control match each other. The flight controller 104 does not prohibit switching when those movement speeds match each other, whereas the flight controller 104 prohibits switching when those movement speeds do not match each other. Further, for example, the flight controller 104 restricts switching based on whether or not a difference between the movement speed in the first autonomous flight control and the movement speed in the second autonomous flight control is smaller than a threshold value. The flight controller 104 does not prohibit switching when the difference is smaller than the threshold value, whereas the flight controller 104 prohibits switching when the difference is equal to or larger than the threshold value.

The processing of the flight controller 104 is not limited to the above-mentioned example. For example, each of the first information and the second information may be information on opening/closing of the mechanism for holding a package of the unmanned aerial vehicle 10, and similarly to the second and third embodiments, the flight controller 104 may restrict switching based on whether or not pieces of information on opening/closing of the holding mechanism match each other. Further, similarly to the second and third embodiments, switching may be restricted based on whether or not pieces of information on opening/closing of the safety mechanism match each other, and may be restricted based on the prohibited direction corresponding to the positional information.

With the unmanned aerial vehicle control system 1 according to the fourth embodiment, it is possible to effectively improve the stability of flight in the case of switching control, by restricting switching from the first autonomous flight control to the second autonomous flight control. Further, for example, it is possible to switch between a plurality of the autonomous flight modes while ensuring the stability of flight even without causing the unmanned aerial vehicle 10 to hover. Thus, the unmanned aerial vehicle 10 is not required to hover excessively. As a result, it is possible to prevent the unmanned aerial vehicle 10 from consuming excessive energy, and enable the unmanned aerial vehicle 10 to reach the target location Q more quickly.

Further, switching is restricted based on at least one of the movement direction or movement speed in the first autonomous flight control and at least one of the movement direction or movement speed in the second autonomous flight control, to thereby be able to restrict switching in a case where a direction greatly different from the current movement direction of the unmanned aerial vehicle 10 is specified by the second autonomous flight control or restrict switching in a case where a speed greatly different from the current movement speed of the unmanned aerial vehicle 10 is specified by the second autonomous flight control, for example. Thus, it is possible to effectively improve the stability of flight. That is, it is possible to prevent the unmanned aerial vehicle 10 from losing its balance by turning abruptly, starting abruptly, or applying braking abruptly.

Further, through use of, as the first information and the second information, information on the flight path for autonomous flight or information on a result of detecting the state of the unmanned aerial vehicle 10 that is autonomously flying, it is possible to ensure the stability of flying by the unmanned aerial vehicle 10 in a case where the autonomous flight mode is switched among the plurality of the autonomous flight modes.

5. Modification Examples

The present invention is not limited to the embodiments described above, and can be modified suitably without departing from the spirit of the present invention.

Figure 11:
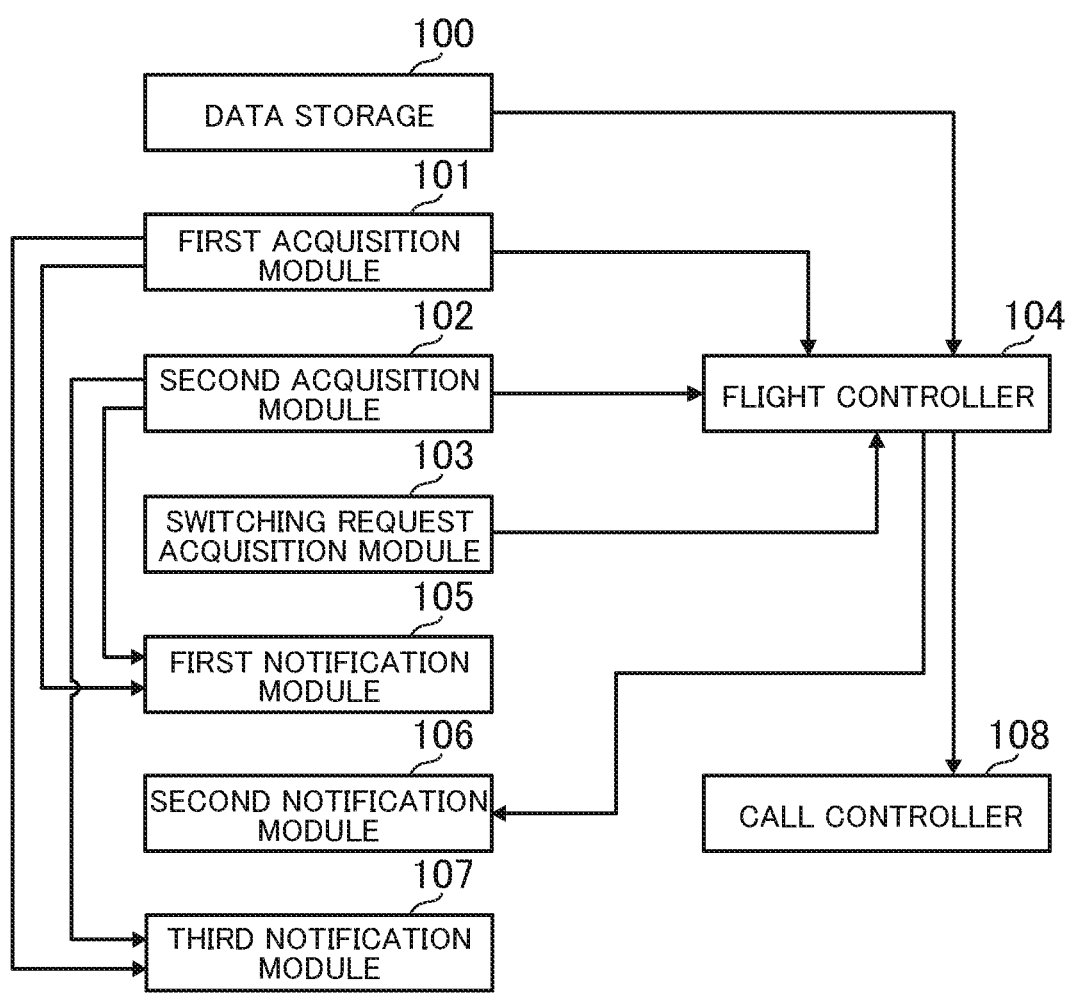
FIG. 11 is a functional block diagram of modification examples.

FIG. 11 is a functional block diagram of modification examples. As illustrated in FIG. 11, in the modification examples described below, a first notification module 105, a second notification module 106, a third notification module 107, and a call controller 108 are implemented in addition to the functions described in the embodiments. Each function is mainly implemented by the controller 11.

(1) For example, in the first embodiment, a wireless operation device 20 that is to receive the operation authority may identify whether or not the wireless operation device 20 has become able to receive the operation authority. Further, for example, in the second embodiment, when the autonomous flight mode is to be switched to the manual flight mode, the wireless operation device 20 may identify whether or not the autonomous flight mode can be switched to the manual flight mode. Further, for example, in the third embodiment, when the manual flight mode is to be switched to the autonomous flight mode, the wireless operation device 20 may identify whether or not the manual flight mode can be switched to the autonomous flight mode. Further, for example, in the fourth embodiment, when the first autonomous flight mode is to be switched to the second autonomous flight mode, the wireless operation device 20 may identify whether or not the autonomous flight mode can be switched from the first autonomous flight mode to the second autonomous flight mode.

In Modification Example (1), similarly to the embodiments, the flight controller 104 switches control when the control can be switched to control of the unmanned aerial vehicle 10 based on the second information and a predetermined switching request is acquired from the wireless operation device 20. Further, the wireless operation device 20 in this modification example may include a light emitter, for example, an LED light, a sound output device such as a speaker or an earphone jack, and a vibration device, for example, a vibrator.

The unmanned aerial vehicle control system 1 includes the first notification module 105. The first notification module 105 of the wireless operation device 20 issues a predetermined notification when the control can be switched to control of the unmanned aerial vehicle 10 based on the second information. A condition that enables the control to be switched is as described above in the first to fourth embodiments, and for example, the condition may be such a condition that the first instruction information and the second instruction information match each other or are similar to each other as in the first embodiment, or may be such a condition that the first information and the instruction information match each other or are similar to each other as in the second embodiment. Further, for example, as in the third and fourth embodiments, the condition may be such a condition that the first information and the second information match each other or are similar to each other. The first notification module 105 may determine whether or not the condition is satisfied by itself, or may acquire the result of determination from, for example, the flight controller 104.

The predetermined notification is only required to be a notification determined in advance, and may be, for example, a notification that utilizes eyesight, hearing, or touch. For example, the predetermined notification is to display a predetermined image, to cause a predetermined light emitter to emit light, to output a predetermined sound, or to cause vibration having a predetermined pattern.

For example, the first notification module 105 transmits, to the wireless operation device 20, an instruction to issue a predetermined notification when control can be switched. The instruction may be transmitted through transmission of data having a predetermined format. When the wireless operation device 20 receives the instruction, the wireless operation device 20 issues a predetermined notification.

For example, the wireless operation device 20 displays, on the display 25, an image indicating the fact that control can be switched. Further, for example, the wireless operation device 20 causes the light emitter to emit light indicating the fact that control can be switched. Further, for example, the wireless operation device 20 uses the sound output device to output a sound indicating the fact that control can be switched. Further, for example, the wireless operation device 20 causes vibration having a predetermined pattern indicating the fact that control can be switched.

With Modification Example (1), the wireless operation device 20 issues a predetermined notification when control can be switched to control based on the second information. Thus, it is possible to notify the operator in advance of the fact that the operator can perform operation. Therefore, it is possible to prevent the operation authority from being transferred to the operator abruptly or prevent the flight mode from being switched abruptly to confuse the operator. Further, it is possible to prevent the operator from transmitting an unrequired switching request when control cannot be switched. As a result, it is also possible to reduce the processing load or communication amount of the unmanned aerial vehicle control system 1.

(2) Further, for example, in the first embodiment, a wireless operation device 20 that is to receive the operation authority may identify the fact that the operation authority has been transferred. Further, for example, in the second embodiment, when the autonomous flight mode has been switched to the manual flight mode, the wireless operation device 20 may identify the fact that the flight mode has been switched. Further, for example, in the third embodiment, when the manual flight mode has been switched to the autonomous flight mode, the wireless operation device 20 may identify the fact that the flight mode has been switched. Further, for example, in the fourth embodiment, when the first autonomous flight mode has been switched to the second autonomous flight mode, the wireless operation device 20 may identify the fact that the autonomous flight mode has switched from the first autonomous flight mode to the second autonomous flight mode.

The unmanned aerial vehicle control system 1 includes the second notification module 106. The second notification module 106 of the wireless operation device 20 issues a predetermined notification when the control has been switched to control of the unmanned aerial vehicle 10 based on the second information.

The meaning of "notification" is as described above in Modification Example (1).

For example, the second notification module 106 transmits, to the wireless operation device 20, an instruction to issue a predetermined notification when control has been switched. The instruction may be transmitted through transmission of data having a predetermined format. When the wireless operation device 20 receives the instruction, the wireless operation device 20 issues a predetermined notification.

For example, the wireless operation device 20 displays, on the display 25, an image indicating the fact that control has been switched. Further, for example, the wireless operation device 20 causes the light emitter to emit light indicating the fact that control has been switched. Further, for example, the wireless operation device 20 uses the sound output device to output a sound indicating the fact that control has been switched. Further, for example, the wireless operation device 20 causes vibration having a predetermined pattern indicating the fact that control has been switched.

With Modification Example (2), when control has been switched to control based on the second information, the wireless operation device 20 issues a predetermined notification, and thus, for example, it is possible to enable the operator to reliably understand that the operation authority has been transferred or the flight mode has been switched, to thereby prevent the operator from being confused.

(3) Further, for example, in the first embodiment, the wireless operation device 20 may identify an item (e.g., item that does not match within second information) required for switching. Further, for example, in the second embodiment, the wireless operation device 20 may identify an item (e.g., specified direction or specified speed) required for switching from the autonomous flight mode to the manual flight mode. Further, for example, in the third embodiment, the wireless operation device 20 may identify an item (e.g., specified direction or specified speed) required for switching from the manual flight mode to the autonomous flight mode. Further, for example, in the fourth embodiment, the wireless operation device 20 may identify an item required for switching from the first autonomous flight mode to the second autonomous flight mode.

The unmanned aerial vehicle control system 1 includes the third notification module 107. When switching is restricted by the flight controller 104, the third notification module 107 notifies the wireless operation device 20 of information for canceling the restriction. For example, the third notification module 107 notifies the wireless operation device 20 of an item for which the first instruction information and the second instruction information do not match each other, or notifies the wireless operation device 20 of an item for which the first information and the instruction information do not match each other. Further, for example, the third notification module 107 may notify an item (e.g., specified direction or specified speed) required for switching from the manual flight mode to the autonomous flight mode, or notify an item required for switching from the first autonomous flight mode to the second autonomous flight mode in the fourth embodiment. The meaning of "notify" is as described above in Modification Example (1). The wireless operation device 20 to be notified may be the first wireless operation device or the second wireless operation device in the case of application to the processing of the first embodiment.

The method of determining whether or not the first instruction information and the second instruction information match each other is as described above in the first embodiment, and the method of determining whether or not the first information and the instruction information match each other is as described above in the second embodiment. Further, the method of determining whether or not the first information and the second information match each other is as described above in the third and fourth embodiments. The third notification module 107 may perform such determination by itself, or may acquire the result of determination from, for example, the flight controller 104.

For example, the third notification module 107 transmits, to the wireless operation device 29, information for identifying an item for which the first instruction information and the second instruction information do not match each other. The second wireless operation device, which has received the information, issues a notification for identifying an operation component corresponding to the item for which the above-mentioned pieces of information do not match each other. Further, for example, the third notification module 107 transmits, to the wireless operation device 20, information for identifying an item for which the first information and the instruction information do not match each other. The wireless operation device 20, which has received the information, issues a notification for identifying an operation component corresponding to the item for which the above-mentioned pieces of information do not match each other. Further, for example, the third notification module 107 may transmit information for identifying an item (e.g., specified direction or specified speed) required for switching from the manual flight mode to the autonomous flight mode, or transmit information for identifying an item required for switching from the first autonomous flight mode to the second autonomous flight mode.

For example, the wireless operation device 20 displays, on the display 25, an image indicating an operation component corresponding to the item for which the above-mentioned pieces of information do not match each other. Further, for example, the wireless operation device 20 causes a light emitter, which corresponds to an operation component corresponding to the item for which the above-mentioned pieces of information do not match each other, to emit light. Further, for example, the wireless operation device 20 uses the sound output device to output a sound indicating an operation component corresponding to the item for which the above-mentioned pieces of information do not match each other. Further, for example, the wireless operation device 20 generates vibration near an operation component corresponding to the item for which the above-mentioned pieces of information do not match each other.

With Modification Example (3), the operator is notified of an item required for canceling restriction of switching, and thus the operator can easily grasp for which operation component the operation state is to be changed to enable operation or switching of the flight mode.

(4) Further, for example, in the first embodiment, when the operation authority is transferred, a wireless operation device 20 that is to give the operation authority and a wireless operation device 20 that is to receive the operation authority may make a phone call to each other.

In this modification example, the wireless operation device 20 includes a call device including: a sound input device, for example, a microphone; and a sound output device such as a speaker or an earphone jack. The call device of the wireless operation device 20 transmits a sound detected by the sound input device to the outside via the communicator 23, and outputs a sound received from the outside via the communicator 23 to the sound output device.

The unmanned aerial vehicle control system 1 includes the call controller 108. The call controller 108 causes the first wireless operation device and the second wireless operation device to communicate to/from each other on the call when control of the unmanned aerial vehicle based on the first instruction information is to be switched to control of the unmanned aerial vehicle based on the second instruction information. The call controller 108 allows the first wireless operation device and the second wireless operation device to make a phone call to each other on condition that control is to be switched or becomes able to be switched therebetween. For example, the call controller 108 of the unmanned aerial vehicle 10 acquires a sound detected by a sound input device of a first wireless transmitter, and transmits the sound to a second wireless transmitter. Further, for example, the call controller 108 of the unmanned aerial vehicle 10 acquires a sound detected by a sound input device of the second wireless transmitter, and transmits the sound to the first wireless transmitter.

With Modification Example (4), when control based on the first instruction information from the first wireless operation device is to be switched to control based on the second instruction information from the second wireless operation device, the operator of the first wireless operation device and the operator of the second wireless operation device make a phone call to each other, to thereby effectively improve the stability of flying by the unmanned aerial vehicle 10. Further, in a case where those operators make a phone call to each other via the unmanned aerial vehicle 10, those operators can make a phone call to each other even when the wireless operation devices 20 cannot communicate to/from each other directly.

(5) Further, for example, in the first embodiment, a description has been given of a case in which the operation authority is transferred from the first wireless operation device to the second wireless operation device all at once. However, the operation authority may gradually be transferred from the first wireless operation device to the second wireless operation device to suppress an influence of the second instruction information, to thereby restrict flight control based on the second instruction information. That is, in the first embodiment, a description has been given of a case in which the state of the first instruction information being 100% effective is transferred to the state of the second instruction information being 100% effective. However, an effective proportion of the first instruction information may gradually be decreased to gradually increase an effective proportion of the second instruction information.

Similarly, in the second embodiment, a description has been given of a case in which the autonomous flight mode is switched to the manual flight mode all at once. However, the autonomous flight mode may gradually be switched to the manual flight mode. That is, in the second embodiment, a description has been given of a case in which the state of the autonomous flight mode being 100% effective is transferred to the state of the manual flight mode being 100% effective. However, an effective proportion of the autonomous flight mode may gradually be decreased to gradually increase an effective proportion of the manual flight mode.

Similarly, in the third embodiment, a description has been given of a case in which the manual flight mode is switched to the autonomous flight mode all at once. However, the manual flight mode may gradually be switched to the autonomous flight mode. That is, in the third embodiment, a description has been given of a case in which the state of the manual flight mode being 100% effective is transferred to the state of the autonomous flight mode being 100% effective. However, an effective proportion of the manual flight mode may gradually be decreased to gradually increase an effective proportion of the autonomous flight mode.

Similarly, in the fourth embodiment, a description has been given of a case in which the first autonomous flight mode is switched to the second autonomous flight mode all at once. However, the first autonomous flight mode may gradually be switched to the second autonomous flight mode. That is, in the fourth embodiment, a description has been given of a case in which the state of the first autonomous flight mode being 100% effective is transferred to the state of the second autonomous flight mode being 100% effective. However, an effective proportion of the first autonomous flight mode may gradually be decreased to gradually increase an effective proportion of the second autonomous flight mode.

The flight controller 104 in Modification Example (5) gradually switches to control of the unmanned aerial vehicle based on the second information. For example, the flight controller 104 gradually switches from control of the unmanned aerial vehicle 10 based on the first instruction information to control of the unmanned aerial vehicle 10 based on the second instruction information. For example, the flight controller 104 gradually decreases an effective proportion of the first instruction information, and gradually increases an effective proportion of the second instruction information. The term "gradually" has the same meaning as "little by little", and refers to changing step by step with the elapse of time.

It is assumed that data indicating a change in each proportion of the first instruction information and the second instruction information is stored in the data storage 100 in advance. The data may have, for example, a number format or table format, or may be apart of a program code. The data defines, for example, an elapse of time since a switching request is issued, and each proportion of the first instruction information and the second instruction information. The flight controller 104 starts counting time when a switching request is received, and acquires the proportion of the first instruction information and the proportion of the second instruction information based on the elapse of time. The flight controller 104 determines details of control based on the acquired proportion of the first instruction information and the acquired proportion of the second instruction information.

For example, the flight controller 104 may control the unmanned aerial vehicle 10 based on a weighted average value of the first instruction information and the second instruction information. In this case, the flight controller 104 controls the unmanned aerial vehicle 10 based on a sum of a value obtained by multiplying the value of the first instruction information by a first coefficient and a value obtained by multiplying the value of the second instruction information by a second coefficient. It is assumed that the sum of the first coefficient and the second coefficient is 1.

For example, when input to the stick ST is given as an example, the flight controller 104 controls the unmanned aerial vehicle 10 based on the sum of a value obtained by multiplying the inclination of the stick ST indicated by the first instruction information by the first coefficient and a value obtained by multiplying the inclination of the stick ST indicated by the second instruction information by the second coefficient. Then, the flight controller 104 gradually decreases the first coefficient and gradually increases the second coefficient. For example, the flight controller 104 changes the first coefficient and the second coefficient so that the proportion of the second instruction information becomes 100% after elapse of a predetermined period of time (e.g., several to several tens of seconds) after reception of a switching request.

In the above, a description has been given of an exemplary case in which the weighted average of the first instruction information and the second instruction information is taken, but the flight controller 104 may take a weighted average of an internal command (e.g., current position, movement direction, movement speed, altitude, posture, or number of revolutions of the motor) determined based on the first instruction information and an internal command determined based on the second instruction information. Also in this case, similarly to the above description, the flight controller 104 outputs, to the actual motor or the like, a sum of a value obtained by multiplying an output to the motor or the like determined based on the first instruction information by the first coefficient, and a value obtained by multiplying an output to the motor or the like determined based on the second instruction information by the second coefficient. Similarly to the above description, the first coefficient is gradually decreased, and the second coefficient is gradually increased.

Further, a period of time until the proportion of the second instruction information becomes 100% may be a fixed value or a variable. When the period of time is a variable, the period of time may be determined based on a difference between the first instruction information and the second instruction information. For example, the flight controller 104 may increase a period of time until the proportion of the second instruction information becomes 100% as the difference between the first instruction information and the second instruction information becomes larger, or the flight controller 104 may decrease the period of time until the proportion of the second instruction information becomes 100% as the difference between the first instruction information and the second instruction information becomes smaller.

In the above, a description has been given of a case in which Modification Example (5) is applied to the first embodiment, but the same holds true also for a case in which Modification Example (5) is applied to the second to fourth embodiments. For example, when Modification Example (5) is applied to the second embodiment, the flight controller 104 may gradually switch from autonomous flight control to control of the unmanned aerial vehicle 10 based on the instruction information. For example, the flight controller 104 gradually decreases an effective proportion of autonomous flight control, and gradually increases an effective proportion of the instruction information. For example, the flight controller 104 gradually switches from the movement direction at the time of autonomous flight to the specified direction specified by the operator, or gradually switches from the movement speed at the time of autonomous flight to the specified direction specified by the operator.

Further, for example, when Modification Example (5) is applied to the third embodiment, the flight controller 104 may gradually switch from flight control of the unmanned aerial vehicle 10 based on the instruction information to autonomous flight control. For example, the flight controller 104 gradually decreases an effective proportion of the instruction information, and gradually increases an effective proportion of the autonomous flight control. For example, the flight controller 104 gradually switches from the specified direction specified by the operator to the movement direction in autonomous flight, or gradually switches from the movement speed specified by the operator to the movement speed in autonomous flight.

Further, for example, when Modification Example (5) is applied to the fourth embodiment, the flight controller 104 may gradually switch from the first autonomous flight control to the second autonomous flight control. For example, the flight controller 104 gradually decreases an effective proportion of the first autonomous flight control, and gradually increases an effective proportion of the second autonomous flight control. For example, the flight controller 104 gradually switches from the movement direction in the first autonomous flight control to the movement direction in the second autonomous flight control, or gradually switches from the movement speed in the first autonomous flight control to the movement speed in the second autonomous flight control.

With Modification Example (5), the control is gradually switched to control based on the second information from the wireless operation device 20, to thereby be able to suppress a change in internal state of the unmanned aerial vehicle 10 more effectively. Thus, it is possible to improve the stability of flying by the unmanned aerial vehicle 10.

(6) Moreover, for example, two or more of Modification Examples (1) to (5) may be combined.

Further, for example, a description has been given of a case in which one wireless communicator 130 communicates to/from one wireless operation device 20, but the wireless communicator 130 may communicate to/from a plurality of wireless operation devices 20. In this case, the wireless operation device 20 may transmit its own identification information (e.g., name or ID of wireless operation device 20) so that the unmanned aerial vehicle 10 identifies the wireless operation device 20 from which the instruction information has been acquired. Further, for example, a description has been given of a case in which control is switched when the wireless operation device 20 has issued a switching request, but a switching request may not particularly be issued. For example, control may be switched when the unmanned aerial vehicle 10 has moved to a predetermined position, or control may be switched depending on, for example, the strength of wind detected by the sensor group 15.

Further, for example, the unmanned aerial vehicle 10 may return to a predetermined location when the unmanned aerial vehicle 10 cannot communicate to/from any wireless operation device 20 that is flying. Further, for example, the unmanned aerial vehicle 10 may fly in the autonomous flight mode when the unmanned aerial vehicle 10 does not communicate to/from any wireless operation device 20. Further, for example, a description has been given of a case in which the operator operates the unmanned aerial vehicle 10 while visually recognizing the unmanned aerial vehicle 10. However, the operator is not particularly required to visually recognize the unmanned aerial vehicle 10. Further, for example, a description has been given of a case in which the wireless operation device 20 identifies the movement direction or movement speed. However, the instruction information may simply indicate only the operation state of the operation device 24, and the unmanned aerial vehicle 10 may identify the movement direction or movement speed.

Further, for example, the unmanned aerial vehicle control system 1 may include a computer (e.g., server computer or personal computer) other than the unmanned aerial vehicle 10, and the computer may execute flight control of each unmanned aerial vehicle 10. In this case, the unmanned aerial vehicle 10 and the wireless operation device 20 may communicate to/from the computer via a network, for example, the Internet. For example, the data storage 100 may be implemented by a database server in the unmanned aerial vehicle control system 1, or may be implemented by a database server outside the unmanned aerial vehicle control system 1.

Further, for example, each function described above may be implemented by any computer in the unmanned aerial vehicle control system 1, and the unmanned aerial vehicle 10, the wireless operation device 20, and other computers, for example, a server, may implement each function in a distributed manner. For example, the flight controller 104 may be implemented by the wireless operation device 20 or the server, and the unmanned aerial vehicle 10 may acquire details of control from the flight controller 104 of the wireless operation device 20 or the server to control revolution of the motor. In this case, the first acquisition module 101, the second acquisition module 102, and the switching request acquisition module 103 may also be implemented by the wireless operation device 20 or the server.

REFERENCE SIGNS LIST 1 unmanned aerial vehicle control system, 10 unmanned aerial vehicle, 11 controller, 12 storage, 13 communicator, 130, 130A, 130B, 130C wireless communicator, 14 photographing device, 15 sensor group, 20, 20A, 20B, 20C wireless operation device 21 controller, 22 storage, 23 communicator, 24 operation device, 25 display, B, B1, B2, B3, B4, B5, B6 button, ST stick, SW switch, TP touch panel, 100 data storage, 101 first acquisition module, 102 second acquisition module, 103 switching request acquisition module, 104 flight controller, 108 call controller, ST1 stick, ST2 stick, SW1 switch, SW2 switch

The invention claimed is:

1. An unmanned aerial vehicle control system, comprising at least one processor configured to:
execute first control of an unmanned aerial vehicle based on first instruction information from a first wireless operation device;
acquire first information, which is at least one piece of the first instruction information or information based on a result of detecting an operation of the unmanned aerial vehicle;
wherein the first information includes information on at least one of a first movement direction and first movement speed of the unmanned aerial vehicle;
acquire second instruction information for operating the unmanned aerial vehicle from a second wireless operation device;
wherein the second instruction information includes information on at least one of a second movement direction and second movement speed of the unmanned aerial vehicle;
compare the first movement direction or first movement speed of the first information and the corresponding second movement direction or second movement speed of the second instruction information and then determine whether or not the first information and the second instruction information match each other or are similar to each other;
wherein the processor
permit switching from the first control to a second control of the unmanned aerial vehicle based on the second instruction information without switching to an autonomous flight mode, if it is determined that the first information and the second instruction information match each other or are similar to each other; and restrict switching from the first control to the second control if it is not determined that the first information and the second instruction information match each other or are similar to each other.

2. The unmanned aerial vehicle control system according to claim 1,
wherein the at least one processor is configured to:
acquire the first instruction information as the first information, and
restrict switching based on the first instruction information and the second instruction information.

3. The unmanned aerial vehicle control system according to claim 2, wherein the at least one processor is configured to restrict switching based on whether the first instruction information and the second instruction information match each other.

4. The unmanned aerial vehicle control system according to claim 1,
wherein the at least one processor is configured to:
switch control from the first control to the second control when the control is enabled to be switched to control of the unmanned aerial vehicle based on the second instruction information and a predetermined switching request is acquired from a wireless operation device, and
issue a predetermined notification in the wireless operation device when the control is enabled to be switched to the control of the unmanned aerial vehicle based on the second instruction information.

5. The unmanned aerial vehicle control system according to claim 1, wherein the at least one processor is configured to issue a predetermined notification in the first wireless operation device or the second wireless operation device when control is switched to control of the unmanned aerial vehicle based on the second information.

6. The unmanned aerial vehicle control system according to claim 1, wherein the at least one processor is configured to notify, when switching is restricted, information for canceling the restriction in the first wireless operation device or the second wireless operation device.

7. The unmanned aerial vehicle control system according to claim 1, wherein the at least one processor is configured to restrict switching when a predetermined switching request for switching to control of the unmanned aerial vehicle based on the second instruction information is acquired.

8. The unmanned aerial vehicle control system according to claim 1, wherein the at least one processor is configured to cause the first wireless operation device and the second wireless operation device to make a phone call to each other when the first control is to be switched to the second control.

9. The unmanned aerial vehicle control system according to claim 1, wherein the at least one processor is configured to gradually switch to the second control.

10. The unmanned aerial vehicle control system according to claim 1, wherein the unmanned aerial vehicle includes the at least one processor.

11. The unmanned aerial vehicle control system according to claim 1, wherein autonomous flight mode comprises any operation without being given an instruction by a user.

12. The unmanned aerial vehicle control system according to claim 1, wherein the unmanned aerial vehicle flies according to the first instruction information before the at least one processor acquires the second instruction information.

* * * * *